United States Patent
Hu et al.

(10) Patent No.: US 12,317,238 B2
(45) Date of Patent: May 27, 2025

(54) TIME DOMAIN RESOURCE DETERMINING METHOD AND APPARATUS, DEVICE, AND STORAGE MEDIA

(71) Applicant: HUAWEI TECHNOLOGIES CO., LTD., Shenzhen (CN)

(72) Inventors: Dan Hu, Beijing (CN); Lei Guan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 496 days.

(21) Appl. No.: 17/702,273

(22) Filed: Mar. 23, 2022

(65) Prior Publication Data
US 2022/0217718 A1    Jul. 7, 2022

Related U.S. Application Data

(63) Continuation of application No. PCT/CN2020/117305, filed on Sep. 24, 2020.

(30) Foreign Application Priority Data

Sep. 24, 2019   (CN) .......................... 201910907118.5

(51) Int. Cl.
   *H04W 72/0446*   (2023.01)
   *H04L 1/1812*   (2023.01)

(52) U.S. Cl.
   CPC ....... *H04W 72/0446* (2013.01); *H04L 1/1812* (2013.01)

(58) Field of Classification Search
   CPC ..................... H04W 72/0446; H04L 1/1812
   USPC ......................................................... 370/336
   See application file for complete search history.

(56) References Cited

U.S. PATENT DOCUMENTS

| | | | |
|---|---|---|---|
| 11,129,174 B2 * | 9/2021 | Gupta | H04W 4/08 |
| 11,832,319 B2 * | 11/2023 | Zhang | H04W 72/30 |
| 2018/0049060 A1 | 2/2018 | Fujishiro et al. | |
| 2018/0295651 A1 * | 10/2018 | Cao | H04W 72/23 |

(Continued)

FOREIGN PATENT DOCUMENTS

| | | |
|---|---|---|
| CN | 104349460 A | 2/2015 |
| CN | 105992376 A | 10/2016 |

(Continued)

OTHER PUBLICATIONS

Chinese Office Action issued in corresponding Chinese Application No. 201910907118.5, dated May 13, 2022, pp. 1-9.
3GPP TS 38.212 V15.6.0 (Jun. 2019), 3rd Generation Partnership Project; Technical Specification Group Radio Access Network; NR; Multiplexing and channel coding(Release 15), 101 pages.

(Continued)

*Primary Examiner* — William Nealon
(74) *Attorney, Agent, or Firm* — HAUPTMAN HAM, LLP

(57) ABSTRACT

A time domain resource determining method includes obtaining a group-radio network temporary identifier (G-RNTI). The method also includes detecting a first downlink control channel in a common search space. The G-RNTI is used for scrambling the first downlink control channel. The method further includes obtaining first time domain resource assignment information. There is an association relationship between the first time domain resource assignment information and the G-RNTI. The method additionally includes determining a time domain resource of a first downlink data channel based on the first time domain resource assignment information and the first downlink control channel.

18 Claims, 11 Drawing Sheets

(56) References Cited

U.S. PATENT DOCUMENTS

| | | | | |
|---|---|---|---|---|
| 2019/0149365 | A1* | 5/2019 | Chatterjee | H04L 25/0226 |
| | | | | 370/329 |
| 2019/0165904 | A1 | 5/2019 | Jo et al. | |
| 2020/0100263 | A1* | 3/2020 | Gupta | H04W 72/121 |
| 2020/0187237 | A1* | 6/2020 | Su | H04L 1/1896 |
| 2021/0153267 | A1* | 5/2021 | Zhang | H04W 72/0446 |
| 2021/0360528 | A1* | 11/2021 | Cai | H04L 5/0096 |

FOREIGN PATENT DOCUMENTS

| | | |
|---|---|---|
| CN | 107920334 A | 4/2018 |
| CN | 109842869 A | 6/2019 |
| CN | 110086579 A | 8/2019 |
| CN | 110166186 A | 8/2019 |
| WO | 2017133440 A1 | 8/2017 |
| WO | 2018028497 A1 | 2/2018 |
| WO | 2018030793 A1 | 2/2018 |
| WO | WO-2019193427 A1 * 10/2019 ........... H04W 56/001 |  |

OTHER PUBLICATIONS

3GPP TS 38.213 V15.6.0 (Jun. 2019), 3rd Generation Partnership Project; Technical Specification Group Radio Access Network; NR; Physical layer procedures for control(Release 15), 107 pages.
3GPP TS 38.214 V15.6.0 (Jun. 2019), 3rd Generation Partnership Project; Technical Specification Group Radio Access Network; NR; Physical layer procedures for data(Release 15), 105 pages.
3GPP TS 38.331 V15.6.0 (Jun. 2019), 3rd Generation Partnership Project; Technical Specification Group Radio Access Network; NR; Radio Resource Control (RRC) protocol specification(Release 15), 519 pages.
Extended European Search Report issued in corresponding European Application No. 20869305.1, dated Sep. 16, 2022, pp. 1-10.
Huawei, CATR, HiSilicon, TD-Tech, ZTE, Potevio, Group-RNTI for SC-PTM. 3GPP TSG-RAN WG2 Meeting #89bis , Bratislava, Slovakia, Apr. 20-24, 2015, R2-151442, 2 pages.
International Search Report issued in corresponding International Application No. PCT/CN2020/117305, dated Dec. 23, 2020, pp. 1-10.

* cited by examiner

TIME DOMAIN RESOURCE DETERMINING METHOD AND APPARATUS, DEVICE, AND STORAGE MEDIA

CROSS-REFERENCE TO RELATED APPLICATIONS

This application is a continuation of International Application No. PCT/CN2020/117305, filed on Sep. 24, 2020, which claims priority to Chinese Patent Application No. 201910907118.5, filed on Sep. 24, 2019. The disclosures of the aforementioned applications are hereby incorporated by reference in their entireties.

TECHNICAL FIELD

This application relates to the field of communications technologies, and in particular, to a time domain resource determining method and apparatus, a device, and a storage medium.

BACKGROUND

A large number of mobile data multimedia services and various high-bandwidth multimedia services, such as interactive Internet Protocol Televisions (Internet Protocol Television, IPTV) and mobile televisions (Television, TV), provide highly robust and extremely important communication services, such as multicast communication (group communication) in a case of disasters, public safety networks, and the like that have higher requirements on broadcast/multicast/multicast services. These mobile data multimedia services require that multiple users receive the same data at the same time. Compared with common unicast data services, these services are characterized by large data volume, long duration, and sensitivity to latency. Currently, the 3rd Generation Partnership Project (3rd Generation Partnership Project, 3GPP) proposes a multimedia broadcast multicast service (Multimedia Broadcast Multicast Service, MBMS) that supports multicast/broadcast/multicast networks in a cellular system. The multimedia broadcast multicast service is a technology for transmitting data from one data source to multiple terminal devices, implementing resource sharing between the core network and the access network, thereby improving the utilization of network resources. The MBMS defined in the 3GPP can not only implement low-rate text message multicast and broadcast, but also implement high-speed multimedia service broadcast and multicast, thus providing various video, audio, and multimedia services for subscribers. The characteristics of broadcast services enable better efficiency in sending information of public interest, which undoubtedly conforms to the trend of mobile data development in the future and provides a better business prospect for the development of communication technologies.

5G new radio (New Radio, NR) supports slot-based scheduling and non-slot-based scheduling, and a time domain location and a time domain length of an NR physical downlink shared channel (Physical Downlink Shared Channel, PDSCH) in a slot are highly flexible. A time domain resource assignment (Time domain resource assignment) field in downlink control information (downlink control information, DCI) of a physical downlink control channel (Physical Downlink Control Channel, PDCCH) supports flexibility of scheduling on the PDSCH in time domain. That is, a terminal device obtains, based on a time domain resource assignment field in detected PDCCH DCI, time domain location information of a PDSCH scheduled by the DCI.

However, currently, NR provides only a method for determining a time domain resource in a unicast transmission scenario, and does not provide a method for determining a time domain location of a PDSCH in a multicast/broadcast/multicast transmission scenario.

SUMMARY

This application provides a time domain resource determining method and apparatus, device, and storage medium, to determine a time domain location of a PDSCH in a multicast/broadcast/multicast transmission scenario.

According to a first aspect, this application provides a time domain resource determining method. The method includes: obtaining a group-radio network temporary identifier G-RNTI; detecting a first downlink control channel in a common search space, where the G-RNTI is used for scrambling the first downlink control channel; obtaining first time domain resource assignment information, where there is an association relationship between the first time domain resource assignment information and the G-RNTI; and determining a time domain resource of a first downlink data channel based on the first time domain resource assignment information and the first downlink control channel Therefore, a time domain location of a PDSCH can be determined in a multicast/broadcast/multicast transmission scenario. Further, a broadcast/multicast/multicast transmission requirement of a terminal device can be met, and the broadcast/multicast/multicast can save transmission resources and effectively avoid transmission congestion.

Optionally, the method further includes: obtaining a radio network temporary identifier RNTI dedicated to the terminal device; detecting a second downlink control channel in a terminal device specific search space, where the dedicated RNTI is used for scrambling the second downlink control channel; obtaining second time domain resource assignment information, where there is an association relationship between the second time domain resource assignment information and the dedicated RNTI; and determining a time domain resource of a second downlink data channel based on the second time domain resource assignment information and the second downlink control channel, where a hybrid automatic repeat request HARQ process number on the second downlink control channel is the same as a HARQ process number on the first downlink control channel. That is, for a broadcast/multicast/multicast retransmission problem, if a network device determines that there are few terminal devices that retransmission is to be performed on, the network device may retransmit in a unicast manner. Unicast retransmission is used, that is, the terminal device uses the time domain resource assignment information corresponding to the RNTI dedicated to the terminal device, to provide a terminal device-specific adaptive resource configuration, and provide link adaptive transmission for the single terminal device. This improves reliability of broadcast/multicast retransmission, and improves a retransmission success rate.

Optionally, the determining a time domain resource of a first downlink data channel based on the first time domain resource assignment information and the first downlink control channel includes: determining the time domain resource of the first downlink data channel based on a value of a time domain resource assignment field in the first downlink control channel and the first time domain resource assignment information.

Optionally, the first time domain resource assignment information is determined by the network device in any one of the following manners: predefinition, system message configuration, or higher layer signaling configuration.

Optionally, the first time domain resource assignment information includes at least one of the following: a time unit offset value, a start and length indicator value SLIV of the first downlink data channel, and a mapping type of the first downlink data channel The time unit offset value is an offset between a second time unit and a first time unit, the first time unit is a time unit for receiving the first downlink control channel, and the second time unit is a time unit for receiving the first downlink data channel.

The following provides a time domain resource determining method performed by a network device side, and provides a time domain resource determining apparatus, a device, a chip, a storage medium, and a computer program product. For effects thereof, refer to effects corresponding to the foregoing time domain resource determining method. Details are not described herein again.

According to a second aspect, this application provides a time domain resource determining method. The method includes: configuring a group-radio network temporary identifier G-RNTI; sending a first downlink control channel, where the G-RNTI is used for scrambling the first downlink control channel; and sending first time domain resource assignment information to a terminal device, where there is an association relationship between the first time domain resource assignment information and the G-RNTI.

Optionally, the method further includes: configuring a radio network temporary identifier RNTI dedicated to the terminal device; sending a second downlink control channel to a terminal device, where the dedicated RNTI is used for scrambling the second downlink control channel; and sending second time domain resource assignment information to the terminal device, where there is an association relationship between the second time domain resource assignment information and the dedicated RNTI. A hybrid automatic repeat request HARQ process number on the second downlink control channel is the same as a HARQ process number on the first downlink control channel.

Optionally, the first time domain resource assignment information is determined by the network device in any one of the following manners: predefinition, system message configuration, or higher layer signaling configuration.

Optionally, the first time domain resource assignment information includes at least one of the following: a time unit offset value, a start and length indicator value SLIV of the first downlink data channel, and a mapping type of the first downlink data channel The time unit offset value is an offset between a second time unit and a first time unit, the first time unit is a time unit for receiving the first downlink control channel, and the second time unit is a time unit for receiving the first downlink data channel According to a third aspect, this application provides a time domain resource determining apparatus, including:

a first obtaining module, configured to obtain a group-radio network temporary identifier G-RNTI;

a first detection module, configured to detect a first downlink control channel in a common search space, where the G-RNTI is used for scrambling the first downlink control channel;

a second obtaining module, configured to obtain first time domain resource assignment information, where there is an association relationship between the first time domain resource assignment information and the G-RNTI; and a first determining module, configured to determine a time domain resource of a first downlink data channel based on the first time domain resource assignment information and the first downlink control channel.

According to a fourth aspect, this application provides a time domain resource determining apparatus, including:

a first configuration module, configured to configure a group-radio network temporary identifier G-RNTI;

a first sending module, configured to send a first downlink control channel, where the G-RNTI is used for scrambling the first downlink control channel; and a second sending module, configured to send first time domain resource assignment information to a terminal device, where there is an association relationship between the first time domain resource assignment information and the G-RNTI.

According to a fifth aspect, this application provides a terminal device, including a memory and a processor, where the memory is configured to store computer instructions, and the processor executes the computer instructions to implement the time domain resource determining method according to the first method or the optional manners of the first method.

According to a sixth aspect, this application provides a network device, including a memory and a processor, where the memory is configured to store computer instructions, and the processor executes the computer instructions to implement the time domain resource determining method according to the second aspect or the optional manners of the second aspect.

According to a seventh aspect, this application provides a chip. The chip is configured to implement the time domain resource determining method according to the first aspect or the optional manners of the first aspect.

According to an eighth aspect, this application provides a chip. The chip is configured to implement the time domain resource determining method according to the second aspect or the optional manners of the second aspect.

According to a tenth aspect, this application provides a computer storage medium, including computer-executable instructions, where the computer-executable instructions are used to implement the time domain resource determining method according to the first aspect or the optional manners of the first aspect.

According to an eleventh aspect, this application provides a computer storage medium, including computer-executable instructions, where the computer-executable instructions are used to implement the time domain resource determining method according to the second aspect or the optional manners of the second aspect.

According to a twelfth aspect, this application provides a computer program product, including computer-executable instructions, where the computer-executable instructions are used to implement the time domain resource determining method according to the first aspect or the optional manners of the first aspect.

According to a thirteenth aspect, this application provides a computer program product, including computer-executable instructions, where the computer-executable instructions are used to implement the time domain resource determining method according to the second aspect or the optional manners of the second aspect.

According to a fourteenth aspect, this application provides a time domain resource determining method. The method includes: A terminal device receives system information, where the system information is used to carry information about an (SC-)MCCH, and the information about the (SC-)MCCH includes time domain resource assignment information related to the (SC-)MCCH. Optionally, the terminal device detects a third downlink control channel in a common search space. The terminal device determines a time domain resource of a third downlink data channel based on the time domain resource assignment information related to the (SC-)MCCH and the third downlink control channel (optional). The terminal device receives broadcast data on the third downlink data channel That is, a network device may configure the time domain resource assignment information related to the (SC-)MCCH for the terminal device by using the system information, so that time domain resource assignment information of unicast transmission is not used for broadcast/multicast/multicast transmission. This ensures effective broadcast/multicast/multicast transmission.

According to a fifteenth aspect, this application provides a time domain resource determining method. The method includes: A terminal device receives system information, where the system information is used to carry information about an (SC-)MCCH, and the information about the (SC-)MCCH includes time domain resource assignment information related to an (SC-)MTCH. Optionally, the terminal device detects a fourth downlink control channel in a common search space. The terminal device determines a time domain resource of a fourth downlink data channel based on the time domain resource assignment information related to the (SC-)MTCH and the fourth downlink control channel (optional). The terminal device receives broadcast data on the fourth downlink data channel That is, the network device may configure the time domain resource assignment information related to the (SC-)MTCH for the terminal device by using the system information, so that time domain resource assignment information of unicast transmission is not used for broadcast/multicast/multicast transmission. This ensures effective broadcast/multicast/multicast transmission.

According to a sixteenth aspect, this application provides a time domain resource determining method. The method includes: A terminal device receives (SC-)MCCH information, where the (SC-)MCCH information carries time domain resource assignment information related to an (SC-)MTCH. Optionally, the terminal device detects a fifth downlink control channel in a common search space. The terminal device determines a time domain resource of a fifth downlink data channel based on the time domain resource assignment information related to the (SC-)MTCH and the fifth downlink control channel (optional). The terminal device receives broadcast data on the fifth downlink data channel. That is, the network device may configure the time domain resource assignment information related to the (SC-)MTCH for the terminal device by using the (SC-)MCCH information, so that time domain resource assignment information of unicast transmission is not used for broadcast/multicast/multicast transmission. This ensures effective broadcast/multicast/multicast transmission.

In conclusion, this application provides a time domain resource determining method and apparatus, a device, and a storage medium. The network device configures the first time domain resource assignment information for the terminal device, and the first time domain resource assignment information meets the broadcast/multicast/multicast transmission requirement of the terminal device. Optionally, the network device may further configure the second time domain resource assignment information for the terminal device, so that both a unicast transmission requirement of the terminal device and the broadcast/multicast/multicast transmission requirement of the terminal device are met. The broadcast/multicast/multicast can save transmission resources and effectively avoid transmission congestion. Further, for the broadcast/multicast/multicast retransmission problem, if the network device determines that there are few terminal devices that retransmission is to be performed on, the network device may retransmit in the unicast manner. Unicast retransmission is used, that is, the terminal device uses the time domain resource assignment information corresponding to the RNTI dedicated to the terminal device, to provide the terminal device-specific adaptive resource configuration, and provide link adaptive transmission for the single terminal device. This improves the reliability of broadcast/multicast retransmission, and improves the retransmission success rate.

DESCRIPTION OF EMBODIMENTS

Figure 1:
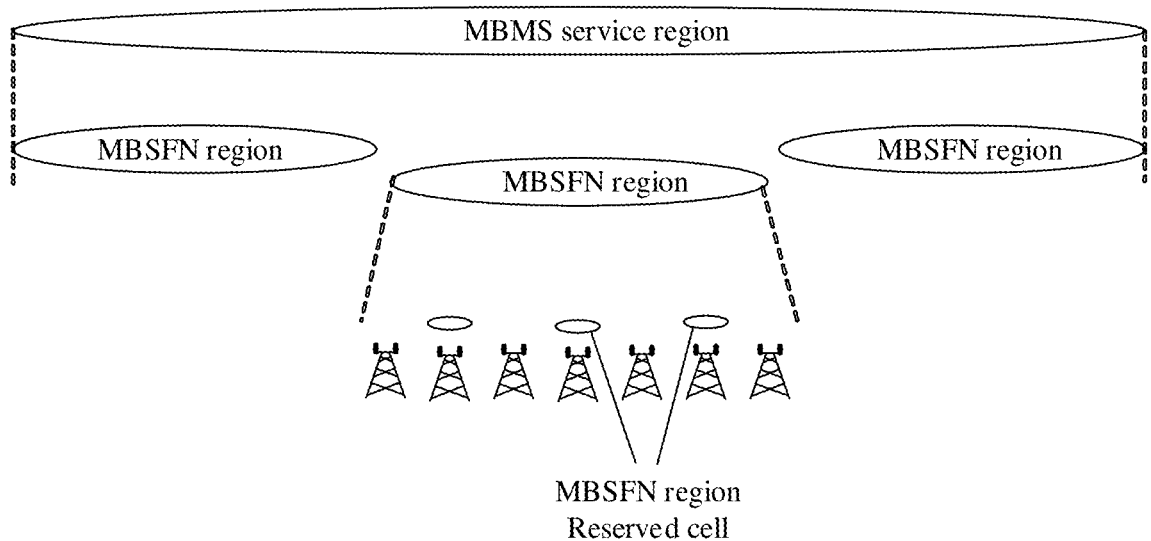
FIG. 1 is a schematic diagram of an MBSFN service region.

The International Telecommunication Union (International Telecommunication Union, ITU) defines three types of application scenarios for a fifth generation (5 Generation, 5G) mobile communication system and a future mobile communication system-enhanced mobile broadband (Enhanced Mobile Broadband, eMBB), ultra-reliable and low-latency communication (Ultra-Reliable and Low-Latency Communication, URLLC), and massive machine type communications (massive machine type communications, mMTC). Typical eMBB services include ultra-high definition video, augmented reality (Augmented Reality, AR), virtual reality (Virtual Reality, VR), and the like. These services are mainly characterized by large data transmission volume and a high transmission rate. Typical URLLC services include wireless control in an industrial manufacturing or production process, motion control and remote repair of unmanned vehicles and unmanned aircrafts, a tactile interaction application such as remote surgery, and the like. These services are mainly characterized by ultra-high reliability, low latency, relatively small data transmission volume, and bursting. Typical mMTC services include automatic intelligent power distribution, a smart city, and the like, and are mainly characterized by a large quantity of networking devices, relatively small data transmission volume, and insensitivity of data to a transmission latency. These mMTC terminals need to meet requirements for low costs and very long standby time.

As described above, a large number of mobile data multimedia services and various high-bandwidth multimedia services, such as IPTVs and mobile TVs, provide highly robust and extremely important communication services, such as multicast communication in a case of disasters, public safety networks, and the like that impose higher requirements on multicast/broadcast/multicast services. These mobile data multimedia services require that multiple users receive the same data at the same time. Compared with common data services, these services are characterized by large data volume, long duration, and sensitivity to latency. Currently, the 3GPP proposes an MBMS that supports multicast/broadcast/multicast networks in a cellular system. The MBMS is a technology for transmitting data from one data source to multiple terminal devices, implementing resource sharing between a core network and an access network. Therefore, utilization of network resources is improved. The MBMS defined in the 3GPP can not only implement low-rate text message multicast and broadcast, but also implement high-speed multimedia service broadcast and multicast, thus providing various video, audio, and multimedia services for subscribers. The characteristics of broadcast services enable better efficiency in sending information of public interest, which undoubtedly conforms to the trend of mobile data development in the future and provides a better business prospect for the development of communication technologies.

There are two modes of carrying an MBMS: multicast/broadcast single frequency network (Multicast/Broadcast Single Frequency Network, MBSFN) and single cell point-to-multipoint (Single Cell Point to Multipoint, SC-PTM).

Figure 2:
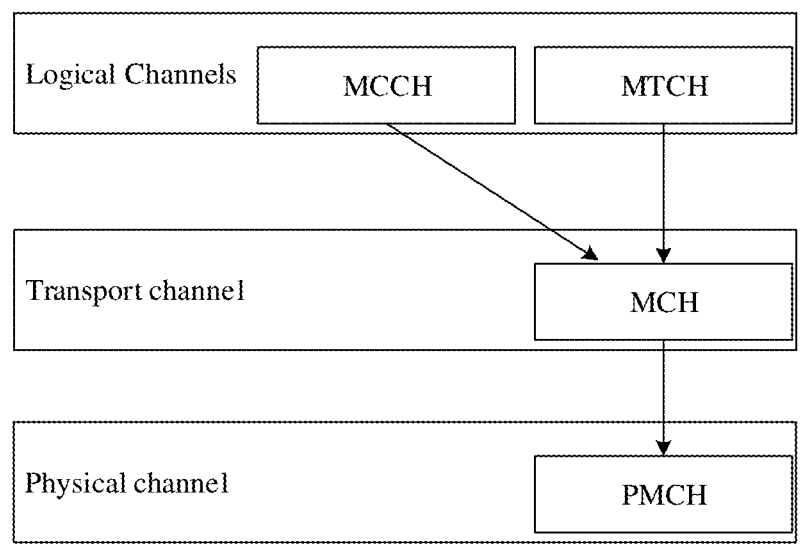
FIG. 2 is a schematic diagram of channel mapping related to an MBSFN.
Figure 3:
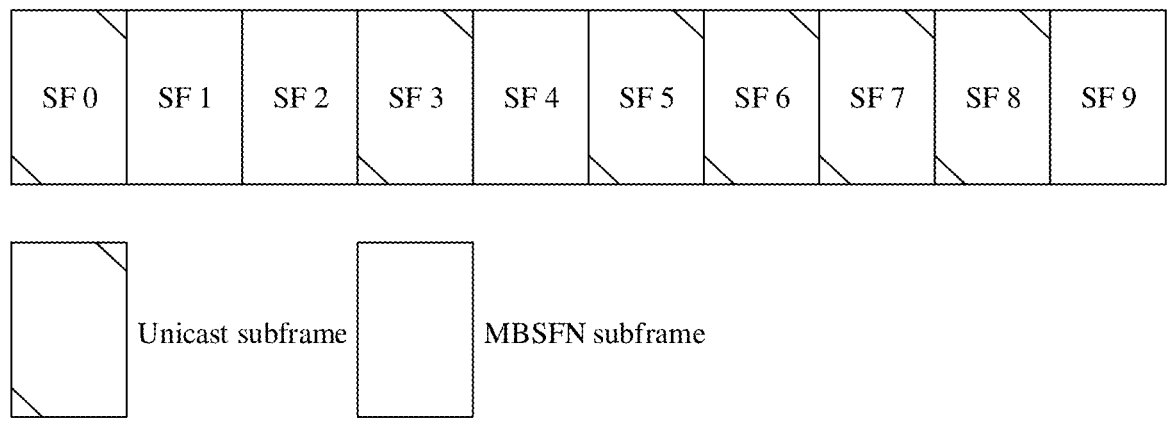
FIG. 3 is a schematic diagram of a relationship between an MBSFN subframe and a unicast subframe in FDD.

FIG. 1 is a schematic diagram of an MBSFN service region. As shown in FIG. 1, an MBMS service region generally includes multiple multimedia broadcast single frequency network (Multimedia Broadcast single frequency network, MBSFN) regions, and terminal devices located in a same MBMS service region receive same content. This communication manner may be referred to as a multi-cell broadcast manner. Multi-cell broadcast means that the multiple cells transmit same information, which may be utilized by a terminal device to effectively use signal power from multiple cells. This greatly improves coverage. Because a same signal is transmitted in the multiple cells (for example, transmitting the same content and using the same modulation and coding scheme), and transmission time is synchronized between cells, the terminal device receives the signal as if the signal is received from a single cell and has been transmitted in multipath. Therefore, signal reception strength is improved, and inter-cell interference is eliminated. FIG. 2 is a schematic diagram of channel mapping related to an MBSFN. As shown in FIG. 2, the MBSFN supports two types of logical channels: a multicast traffic channel (Multicast Traffic Channel, MTCH) and a multicast control channel (Multicast Control Channel, MCCH). The MTCH is used to transmit MBMS subscriber data. If an MBSFN area provides multiple MBMS services, multiple MTCHs may be configured. The MCCH is used to transmit control information related to receiving an MBMS service, including subframe allocation, a modulation and coding scheme, and the like of each multicast channel (Multicast Channel, MCH). Each MBSFN has only one MCCH, and one MCCH corresponds to only one MBSFN region. The MCCH and MTCH are multiplexed onto a transport channel MCH. A transmission format and resource allocation of the MCH are determined by a multi-cell/multicast coordination entity (Multi-cell/Multicast Coordination Entity, MCE), and are sent to the terminal device through the MCCH. The MCH is mapped onto a physical multicast channel (Physical Multicast Channel, PMCH), and transmitted on an MBSFN subframe. It should be noted that transmission of the MCH is MBSFN region-specific rather than cell-specific. Therefore, PMCH scrambling is also MBSFN region-specific. In a Long Term Evolution (Long Term Evolution, LTE) system, one subframe is 1 ms and includes two slots. An MBSFN subframe consists of a control region and an MBSFN region. The MBSFN region is used to transmit (P)MCHs. FIG. 3 is a schematic diagram of a relationship between an MBSFN subframe and a unicast subframe in frequency division duplex (Frequency Division Duplexing, FDD). As shown in FIG. 3, in FDD, unicast subframes are subframe (Subframe, SF) 0, SF 3, and SF 5 to SF 8, and MBSFN subframes are SF 1, SF 2, SF 4, and SF 9.

SC-PTM: Single-cell MBMS is introduced in Long Term Evolution Advanced (LTE-Advanced, LTE-A). Unlike the MBSFN, the SC-PTM only sends MBMS information to a cell that expects to receive the MBMS information. A process in which a terminal device receives a broadcast message by using the SC-PTM is as follows:

Step 1: The terminal device receives a system information block (System Information Block, SIB) 20, to obtain information about a single cell multicast control channel (Single Cell Multicast Control Channel, SC-MCCH).

Step 2: The terminal device receives the single cell multicast control channel (Single Cell Multicast Control Channel, SC-MCCH), where the SC-MCCH is scrambled by using a single cell radio network temporary identifier (Single Cell Radio Network Temporary Identity, SC-RNTI), and the SC-MCCH is used to carry SC-PTM configuration information.

SC-MCCH sending method: A network device sends scheduling information of the SC-MCCH on a PDCCH of a unicast subframe in which the SC-MCCH is located, and the network device sends the SC-MCCH on a PDSCH of the unicast subframe, where the SC-MCCH includes: a mapping relationship between a temporary mobile group identifier (Temporary Mobile Group Identifier, TMGI) of an MBMS service and a group-radio network temporary identifier (Group-Radio Network Temporary Identifier, G-RNTI) of an SC-PTM service on the PDCCH, and information about a time domain location of the SC-PTM service. Each MBMS service may be uniquely identified by a corresponding TMGI, which may include a Public Land Mobile Network (PLMN) identifier plus a service identifier.

Figure 4:
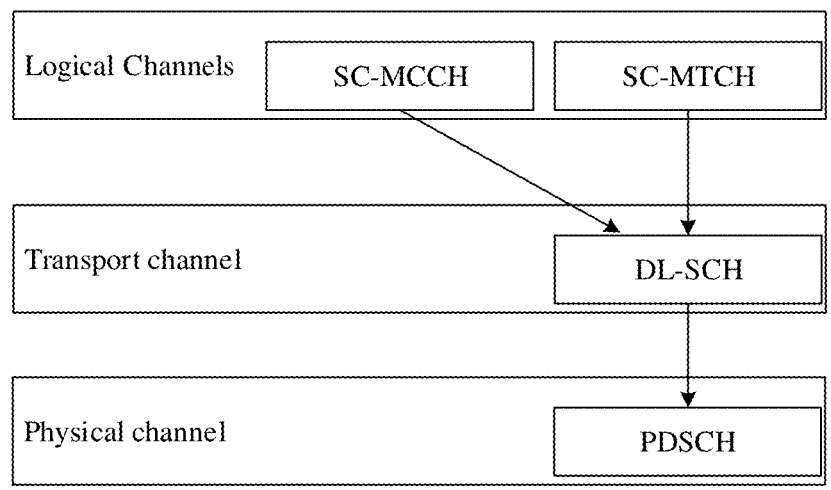
FIG. 4 is a schematic diagram of a channel mapping relationship in SC-PTM.
Figure 5:
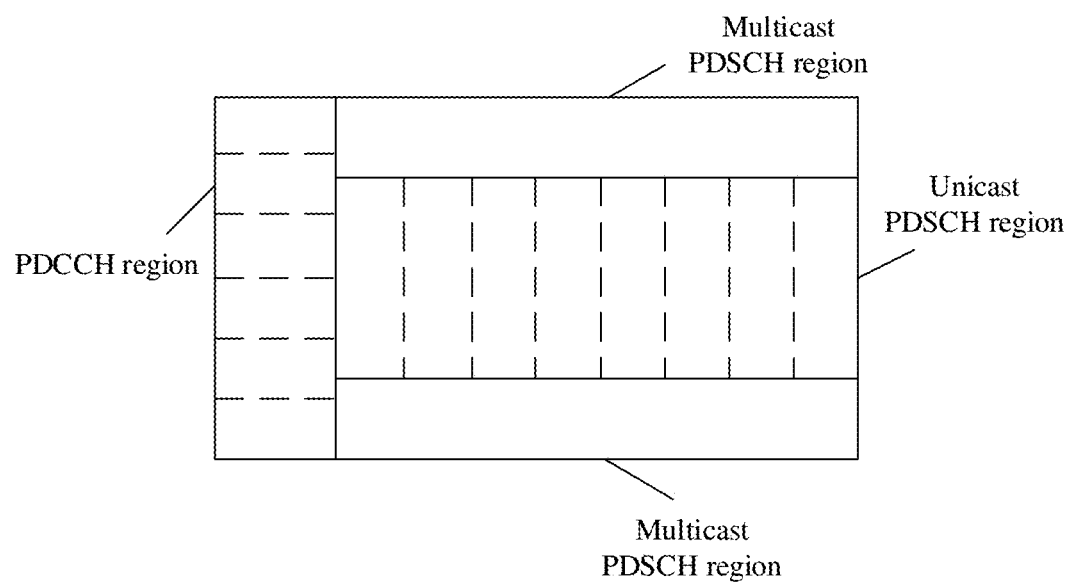
FIG. 5 is a schematic diagram of a structure of an SC-PTM subframe.

Step 3: The terminal device receives a single cell multicast traffic channel (Single cell-Multicast Traffic Channel, SC-MTCH) based on the SC-MCCH, where the SC-MTCH is scrambled by using a G-RNTI. FIG. 4 is a schematic diagram of a channel mapping relationship in SC-PTM. As shown in FIG. 4, logcal channels SC-MCCH and SC-MTCH are mapped onto a transport channel downlink shared channel (Downlink shared channel, DL-SCH). The DL-SCH is mapped to a PDSCH. A G-RNTI is used for scrambling a cyclic redundancy check (Cyclic Redundancy Check, CRC) of a PDCCH that is used to schedule a PDSCH carrying SC-MTCH information. FIG. 5 is a schematic diagram of a structure of an SC-PTM subframe, and time-frequency domain distribution of a PDCCH, a multicast PDSCH, and a unicast PDSCH is shown in FIG. 5.

As described above, NR supports slot-based scheduling and non-slot-based scheduling, and a time domain location and a time domain length of an NR PDSCH in a slot are highly flexible. The terminal device obtains, based on a time domain resource assignment field in detected PDCCH DCI, time domain location information of a PDSCH scheduled by the DCI. The time domain location information includes a slot in which the PDSCH is located, a time domain length of the PDSCH, and a start orthogonal frequency division multiplexing (Orthogonal Frequency Division Multiplexing, OFDM) symbol index of the PDSCH in the slot. If a value of the time domain resource assignment field is m, the terminal device may obtain the location information of the PDSCH from a row whose index number is m+1 in one piece of PDSCH time domain resource allocation (Applicable PDSCH Time Domain Resource Allocation) information. The terminal device may obtain the time domain resource assignment information in different cases by using one of the three ways: predefinition, a system message, and higher layer signaling. The different cases include different cases of a type of an RNTI that is used for scrambling the DCI and that is detected by the terminal device, a type of a search space in which the terminal device is located, and a higher layer parameter configured for the terminal device. For the terminal device in an initial access state, the time domain location of the PDSCH carrying a system message may be obtained by using predefined allocation information. For the terminal device in a radio resource control (Radio Resource Control, RRC) connected mode, the allocation information may be obtained by using a parameter pdsch-TimeDomainAllocationList in higher layer signaling pdsch-Config. When the type of the RNTI used for scrambling the DCI is a cell-radio network temporary identifier (Cell Radio Network Temporary Identifier, C-RNTI), a modulation and coding scheme cell radio network temporary identifier (Modulation and Coding Scheme Cell Radio Network Temporary Identifier, MCS-C-RNTI), or a configured scheduling radio network temporary identifier (Configured Scheduling RNTI, CS-RNTI), the terminal device searches a terminal device specific search space for a terminal device of the DCI, and also, receives the configuration parameter pdsch-TimeDomainAllocationList in the higher layer signaling pdsch-Config. It should be noted that the C-RNTI, the MCS-C-RNTI, and the CS-RNTI are all RNTIs dedicated to the terminal device. Therefore, PDSCH time domain resource assignment information of each terminal device is independently configured, and may be different. In addition, there may be no common PDSCH time domain resource assignment information in PDSCH time domain resource assignment information configured for multiple terminal devices. If the terminal device is not configured with higher layer signaling pdsch-Config or a parameter pdsch-TimeDomainAllocationList, but receives a system message pdsch-ConfigCommon including a parameter pdsch-TimeDomainAllocationList, the PDSCH time domain resource assignment information is obtained based on the parameter. The time domain resource assignment information is common time domain resource assignment information, in other words, the time domain resource assignment information may be applied to all terminal devices in the cell. Specific PDSCH time domain resource allocation manners are shown in Table 1. Default A (that is, Table 2 and Table 3), default B (that is, Table 4), and default C (that is, Table 5) represent three time domain resource allocations determined in a predefined manner. Table 2 is a default A for normal cyclic prefixes. Table 3 is a default A for extended cyclic prefixes.

TABLE 1

| RNTI | PDCCH search space (PDCCH search space) | Predefined (SS/PBCH block and CORESET multiplexing pattern) | System message (pdsch-Config Common includes pdsch-Time Domain Allocation List) | Higher layer signaling (pdsch-Config includes pdsch-Time Domain Allocation List) | PDSCH time domain resource allocation to apply (PDSCH time domain resource allocation to apply) |
|---|---|---|---|---|---|
| System Information Radio Network Temporary Identifier (System Information-Radio Network Temporary Identifier, SI-RNTI) | Type0 common | 1 | — | — | Default A for normal cyclic prefix (Default A for normal CP) |
|  |  | 2 | — | — | Default B (Default B) |
|  |  | 3 | — | — | Default C (Default C) |
| SI-RNTI | Type0A common | 1 | No | — | Default A |
|  |  | 2 | No | — | Default B |
|  |  | 3 | No | — | Default C |
|  |  | 1, 2, 3 | Yes | — | PDSCH time domain resource allocation provided in system |

TABLE 1-continued

| RNTI | PDCCH search space (PDCCH search space) | Predefined (SS/PBCH block and CORESET multiplexing pattern) | System message (pdsch-Config Common includes pdsch-Time Domain Allocation List) | Higher layer signaling (pdsch-Config includes pdsch-Time Domain Allocation List) | PDSCH time domain resource allocation to apply (PDSCH time domain resource allocation to apply) |
|---|---|---|---|---|---|
| | | | | | information (pdsch-Time Domain Allocation List provided in pdsch-Config Common) |
| Random access-Radio Network Temporary Identifier (Random access-Radio Network Temporary Identifier, RA-RNTI) Temporary Cell-Radio Network Temporary Identifier (temporary cell-Radio Network Temporary Identifier, TC-RNTI) | Type1 common | 1, 2, 3<br>1, 2, 3 | No<br>Yes | —<br>— | Default A<br>PDSCH time domain resource allocation provided in system information (pdsch-TimeDomainAllocationList provided in pdsch-ConfigCommon) |
| Paging Radio Network Temporary Identifier (Paging Radio Network Temporary Identifier, P-RNTI) | Type2 common | 1<br>2<br>3<br>1, 2, 3 | No<br>No<br>No<br>Yes | —<br>—<br>—<br>— | Default A<br>Default B<br>Default C<br>PDSCH time domain resource allocation provided in system information (pdsch-Time Domain Allocation List provided in pdsch-ConfigCommon) |
| C-RNTI, MCS-C-RNTI, CS-RNTI | Any common search space associated with CORESET 0 (Any common search space associated with CORESET 0) | 1, 2, 3<br>1, 2, 3 | No<br>Yes | —<br>— | Default A<br>pdsch-Time Domain Allocation List provided in pdsch-Config Common |
| C-RNTI, MCS-C-RNTI, CS-RNTI | Any common search space not associated with CORESET 0 UE specific search space (UE specific search space) | 1, 2, 3<br>1, 2, 3 | No<br>Yes | No<br>No | Default A<br>PDSCH time domain resource allocation provided in system information (pdsch-Time Domain Allocation List provided in pdsch-Config Common) |
| | | 1, 2, 3 | No/Yes | Yes | PDSCH time domain resource allocation |

TABLE 1-continued

| RNTI | PDCCH search space (PDCCH search space) | Predefined (SS/PBCH block and CORESET multiplexing pattern) | System message (pdsch-Config Common includes pdsch-Time Domain Allocation List) | Higher layer signaling (pdsch-Config includes pdsch-Time Domain Allocation List) | PDSCH time domain resource allocation to apply (PDSCH time domain resource allocation to apply) |
|---|---|---|---|---|---|
| | | | | | provided in higher layer signaling (pdsch-TimeDomainAllo-cationList provided in pdsch-Config) |

TABLE 2

| Row index (Row index) | Demodulation Reference Signal-Type A-Position (DMRS-Type A-Position) | PDSCH mapping type (PDSCH mapping type) | K0 | S | L |
|---|---|---|---|---|---|
| 1 | 2 | Type A | 0 | 2 | 12 |
|   | 3 | Type A | 0 | 3 | 11 |
| 2 | 2 | Type A | 0 | 2 | 10 |
|   | 3 | Type A | 0 | 3 | 9 |
| 3 | 2 | Type A | 0 | 2 | 9 |
|   | 3 | Type A | 0 | 3 | 8 |
| 4 | 2 | Type A | 0 | 2 | 7 |
|   | 3 | Type A | 0 | 3 | 6 |
| 5 | 2 | Type A | 0 | 2 | 5 |
|   | 3 | Type A | 0 | 3 | 4 |
| 6 | 2 | Type B | 0 | 9 | 4 |
|   | 3 | Type B | 0 | 10 | 4 |
| 7 | 2 | Type B | 0 | 4 | 4 |
|   | 3 | Type B | 0 | 6 | 4 |
| 8 | 2, 3 | Type B | 0 | 5 | 7 |
| 9 | 2, 3 | Type B | 0 | 5 | 2 |
| 10 | 2, 3 | Type B | 0 | 9 | 2 |
| 11 | 2, 3 | Type B | 0 | 12 | 2 |
| 12 | 2, 3 | Type A | 0 | 1 | 13 |
| 13 | 2, 3 | Type A | 0 | 1 | 6 |
| 14 | 2, 3 | Type A | 0 | 2 | 4 |
| 15 | 2, 3 | Type B | 0 | 4 | 7 |
| 16 | 2, 3 | Type B | 0 | 8 | 4 |

TABLE 3

| Row index | DMRS-TypeA-Position | PDSCH mapping type | K0 | S | L |
|---|---|---|---|---|---|
| 1 | 2 | Type A | 0 | 2 | 6 |
|   | 3 | Type A | 0 | 3 | 5 |
| 2 | 2 | Type A | 0 | 2 | 10 |
|   | 3 | Type A | 0 | 3 | 9 |
| 3 | 2 | Type A | 0 | 2 | 9 |
|   | 3 | Type A | 0 | 3 | 8 |
| 4 | 2 | Type A | 0 | 2 | 7 |
|   | 3 | Type A | 0 | 3 | 6 |
| 5 | 2 | Type A | 0 | 2 | 5 |
|   | 3 | Type A | 0 | 3 | 4 |
| 6 | 2 | Type B | 0 | 6 | 4 |
|   | 3 | Type B | 0 | 8 | 2 |
| 7 | 2 | Type B | 0 | 4 | 4 |
|   | 3 | Type B | 0 | 6 | 4 |
| 8 | 2, 3 | Type B | 0 | 5 | 6 |
| 9 | 2, 3 | Type B | 0 | 5 | 2 |
| 10 | 2, 3 | Type B | 0 | 9 | 2 |
| 11 | 2, 3 | Type B | 0 | 10 | 2 |
| 12 | 2, 3 | Type A | 0 | 1 | 11 |
| 13 | 2, 3 | Type A | 0 | 1 | 6 |
| 14 | 2, 3 | Type A | 0 | 2 | 4 |
| 15 | 2, 3 | Type B | 0 | 4 | 6 |
| 16 | 2, 3 | Type B | 0 | 8 | 4 |

TABLE 4

| Row index | DMRS-TypeA-Position | PDSCH mapping type | K0 | S | L |
|---|---|---|---|---|---|
| 1 | 2, 3 | Type B | 0 | 2 | 2 |
| 2 | 2, 3 | Type B | 0 | 4 | 2 |
| 3 | 2, 3 | Type B | 0 | 6 | 2 |
| 4 | 2, 3 | Type B | 0 | 8 | 2 |
| 5 | 2, 3 | Type B | 0 | 10 | 2 |
| 6 | 2, 3 | Type B | 1 | 2 | 2 |
| 7 | 2, 3 | Type B | 1 | 4 | 2 |
| 8 | 2, 3 | Type B | 0 | 2 | 4 |
| 9 | 2, 3 | Type B | 0 | 4 | 4 |
| 10 | 2, 3 | Type B | 0 | 6 | 4 |
| 11 | 2, 3 | Type B | 0 | 8 | 4 |
| 12 (Note 1) | 2, 3 | Type B | 0 | 10 | 4 |
| 13 (Note 1) | 2, 3 | Type B | 0 | 2 | 7 |
| 14 (Note 1) | 2 | Type A | 0 | 2 | 12 |
|   | 3 | Type A | 0 | 3 | 11 |
| 15 | 2, 3 | Type B | 1 | 2 | 4 |
| 16 | Reserved (Reserved) | | | | |

(Note 1):
If a PDSCH is scheduled with an SI-RNTI in a PDCCH Type 0 common search space, UE may assume that the PDSCH resource allocation is not applied (If the PDSCH was scheduled with SI-RNTI in PDCCH Type0 common search space, the UE may assume that this PDSCH resource allocation is not applied).

TABLE 5

| Row index | DMRS-TypeA-Position | PDSCH mapping type | K0 | S | L |
|---|---|---|---|---|---|
| 1 (Note 1) | 2, 3 | Type B | 0 | 2 | 2 |
| 2 | 2, 3 | Type B | 0 | 4 | 2 |
| 3 | 2, 3 | Type B | 0 | 6 | 2 |
| 4 | 2, 3 | Type B | 0 | 8 | 2 |
| 5 | 2, 3 | Type B | 0 | 10 | 2 |
| 6 | Reserved | | | | |
| 7 | Reserved | | | | |
| 8 | 2, 3 | Type B | 0 | 2 | 4 |

TABLE 5-continued

| Row index | DMRS-TypeA-Position | PDSCH mapping type | K0 | S | L |
|---|---|---|---|---|---|
| 9 | 2, 3 | Type B | 0 | 4 | 4 |
| 10 | 2, 3 | Type B | 0 | 6 | 4 |
| 11 | 2, 3 | Type B | 0 | 8 | 4 |
| 12 | 2, 3 | Type B | 0 | 10 | 4 |
| 13 (Note 1) | 2, 3 | Type B | 0 | 2 | 7 |
| 14 (Note 1) | 2 | Type A | 0 | 2 | 12 |
| | 3 | Type A | 0 | 3 | 11 |
| 15 (Note 1) | 2, 3 | Type A | 0 | 0 | 6 |
| 16 (Note 1) | 2, 3 | Type A | 0 | 2 | 6 |

(Note 1):
The UE may assume that this PDSCH resource allocation is not used, if the PDSCH was scheduled with SI-RNTI in PDCCH Typed common search space Currently, there is no time domain resource allocation manner corresponding to multicast/broadcast/multicast transmission in the NR architecture. Because unicast transmission provides terminal device-specific adaptive parameter configuration, link adaptive transmission is provided for a single terminal device. A broadcast/multicast/multicast service is sent by a network device to multiple terminal devices. Terminal devices that receive the multicast/broadcast/multicast service should receive the same data on the same physical resource. As shown in the last row of Table 1, each terminal device detects a PDCCH in a specific search space, so as to determine a time domain resource of the PDSCH based on a higher layer parameter configured for the specific terminal device. As a result, time domain resources of PDSCHs determined by different terminal devices are different. Therefore, it is impossible to send a multicast/broadcast/multicast service on a unified time domain resource. Therefore, a unicast data channel time domain resource allocation manner in the NR architecture is not applicable to multicast/broadcast/multicast services.

To resolve the foregoing technical problem, this application provides the following inventive concept: The network device configures, for the terminal device, time domain resource assignment information used for multicast/broadcast/multicast service transmission. Optionally, the time domain resource assignment information is time domain resource assignment information additionally configured by the network device, and is different from the PDSCH time domain resource assignment information predefined in the standards in Table 2 to Table 5, and independent of the PDSCH time domain resource assignment information indicated by the higher layer parameter pdsch-Config including pdsch-Time Domain Allocation List and the PDSCH time domain resource assignment information indicated by the system message pdsch-Config Common including pdsch-Time Domain Allocation List. The time domain resource assignment information may be a time domain resource allocation table, a row in a time domain resource allocation table, or a time domain resource allocation set. This is not limited in this application. In addition, the time domain resource assignment information in this application may be preconfigured by the network device for the terminal device. Based on this, both the terminal device side and the network device side store the time domain resource assignment information. Alternatively, when the terminal device needs to use the time domain resource assignment information, the network device configures the time domain resource assignment information for the terminal device in real time.

Figure 6:
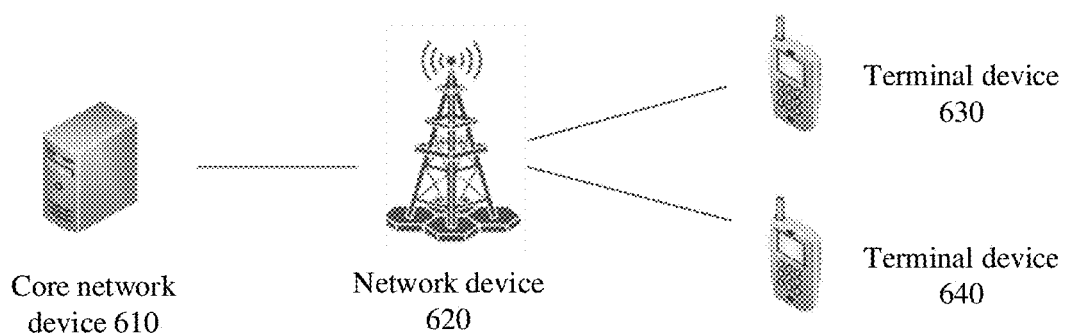
FIG. 6 is a schematic diagram of a mobile communication system according to an embodiment of this application.

The technical solutions of this application are applicable to but are not limited to the following mobile communication systems. FIG. 6 is a schematic diagram of a mobile communication system according to an embodiment of this application. As shown in FIG. 6, the mobile communication system includes a core network device 610, a network device 620, and at least one terminal device (a terminal device 630 and a terminal device 640 shown in FIG. 6). The terminal device is connected to the network device in a wireless manner, and the network device is connected to the core network device in a wireless or wired manner. The core network device and the network device may be different physical devices independent of each other, or functions of the core network device and logical functions of the network device may be integrated into a same physical device, or a part of functions of the core network device and a part of functions of the network device may be integrated into one physical device. The terminal device may be located at a fixed location, or may be mobile. FIG. 6 is merely a schematic diagram of a system. The system may further include other network devices, for example, a wireless relay device and a wireless backhaul device, which are not shown in FIG. 6. Quantities of core network devices, network devices, and terminal devices included in the mobile communication system are not limited in this application.

It should be noted that the technical solutions provided in this application may be applied to various communication systems, for example, an LTE system, an NR system in a 5G mobile communication system, and a future mobile communication system.

The technical solutions of this application involve the following network elements:

Network device: An entity on a network side that transmits or receives signals. The network device in this application may be a base station (Base Transceiver Station, BTS) in Global System of Mobile Communication (Global System of Mobile Communication, GSM) or Code Division Multiple Access (Code Division Multiple Access, CDMA), may be a base station (NodeB, NB) in Wideband Code Division Multiple Access (Wideband Code Division Multiple Access, WCDMA), may be an evolved NodeB (evolved NodeB, eNB) in LTE or evolved Long Term Evolution (evolved Long Term Evolution, eLTE), a next-generation evolved NodeB (next generation-evolved NodeB, ng-eNB), may be an access point (Access Point, AP) or a relay station in a wireless local area network (Wireless Local Area Network, WLAN), may be a gNB in 5G NR, or the like. This is not limited herein.

Terminal device: A terminal device is an entity on a user side that is configured to receive or transmit signals. The terminal device may also be referred to as a terminal Terminal, user equipment (User Equipment, UE), a mobile station (Mobile Station, MS), a mobile terminal (Mobile Terminal, MT), or the like. The terminal device may be a mobile phone (mobile phone), a tablet computer (Pad), a computer with a wireless transceiver function, a virtual reality (Virtual Reality, VR) terminal device, an augmented reality (Augmented Reality, AR) terminal device, a wireless terminal in industrial control (industrial control), a wireless terminal in self-driving (self-driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), or the like.

A specific technology and a specific device form used by the terminal device are not limited in embodiments of this application.

The network device and the terminal device may be deployed on land, and includes an indoor or outdoor device, a handheld device, or a vehicle-mounted device; may be deployed on water; or may be deployed on an aircraft, an unmanned aerial vehicle, a balloon, or a satellite in the air. Application scenarios of the network device and the terminal device are not limited in embodiments of this application.

The following describes the technical solutions of this application in detail.

Figure 7:
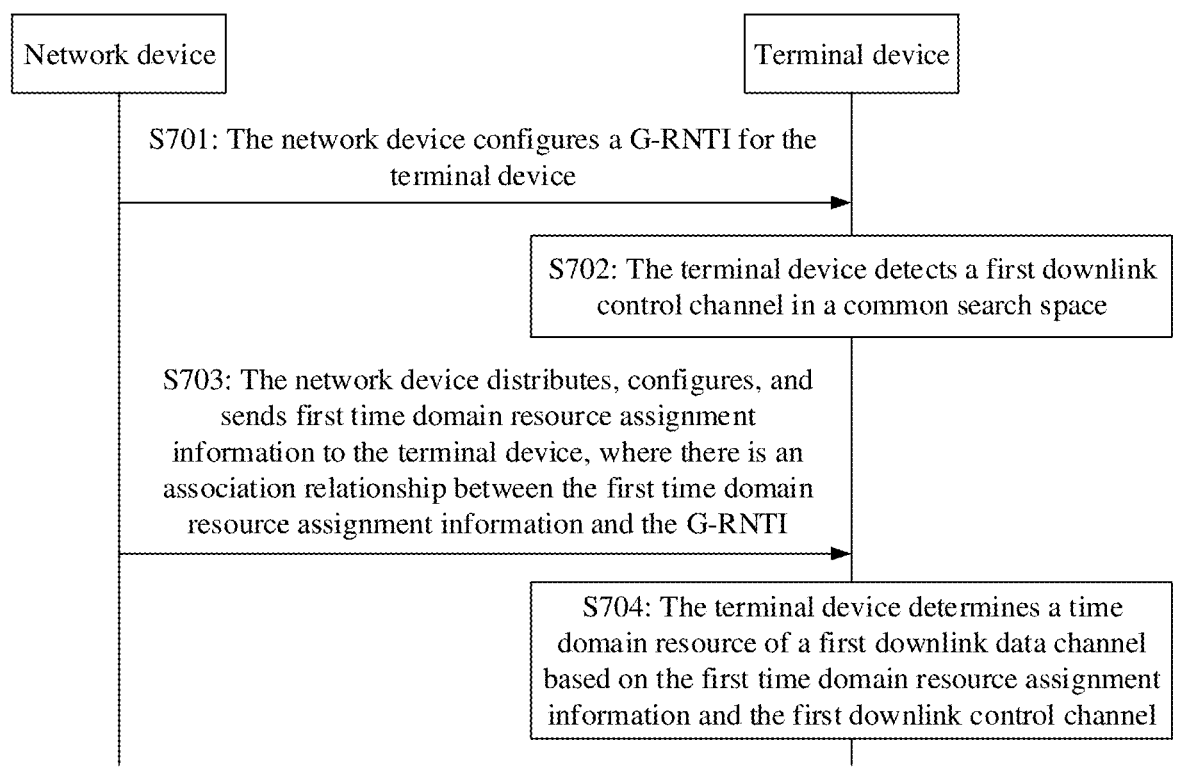
FIG. 7 is an interaction flowchart of a time domain resource determining method according to an embodiment of this application.

FIG. 7 is an interaction flowchart of a time domain resource determining method according to an embodiment of this application. The method involves network elements including a terminal device and a network device. As shown in FIG. 7, the method includes the following steps.

Step S701: A network device configures a G-RNTI for a terminal device.

Optionally, this embodiment may be applied to the following scenario: The terminal device in an RRC connected mode is configured with an RNTI dedicated to the terminal device (that is, a dedicated RNTI used for unicast transmission, such as a C-RNTI, an MCS-C-RNTI, and a CS-RNTI shown in the last row of Table 1) and is also configured with the G-RNTI used for broadcast/multicast/multicast transmission. Based on this, the terminal device may receive both unicast transmission and broadcast transmission. It should be understood that the G-RNTI herein may alternatively be a special identifier (Identifier, ID) or an RNTI, and the G-RNTI is associated with a first downlink control channel The following describes step S701.

After being powered on, the terminal device accesses a cell by performing a cell search and a random access process. In this case, the network device establishes a connection to the terminal device, and the terminal device enters the RRC connected mode. The G-RNTI and an RNTI dedicated to the terminal device are configured for the terminal device in the RRC connected mode. It should be understood that configuring the G-RNTI and the RNTI dedicated to the terminal device may alternatively be in another scenario, for example, in a scenario in which the terminal device performs cell handover, and the network device may configure the G-RNTI and the RNTI dedicated to the terminal device for the terminal device.

The G-RNTI is used for scrambling the first downlink control channel The network device configures, by using higher layer signaling or system information, a same G-RNTI for a group of terminal devices that receive a same broadcast service. The broadcast service herein may alternatively be a multicast service or a multicast service. The first downlink control channel is a downlink control channel for scheduling broadcast/multicast/multicast transmission, for example, a PDCCH for scheduling broadcast/multicast/multicast transmission, and the first downlink control channel is used to schedule a first downlink data channel The first downlink data channel may be used to carry broadcast/multicast/multicast transmission.

The RNTI dedicated to the terminal device is used for scrambling a second downlink control channel. The terminal device may detect the second downlink control channel in a specific search space or a common search space. The second downlink control channel is a downlink control channel for scheduling unicast transmission, for example, a PDCCH for scheduling unicast transmission. The second downlink control channel is used to schedule a second downlink data channel, and the second downlink data channel may be a PDSCH for unicast transmission. The RNTI dedicated to the terminal device may be a C-RNTI, an MCS-C-RNTI, or a CS-RNTI. These RNTIs are RNTIs dedicated to the terminal device. This is not limited in this application.

It should be understood that the first downlink control channel and the second downlink control channel may be specifically classified in different manners. The first downlink control channel and the second downlink control channel may be classified according to different time-frequency resources, different logical locations, or different tree nodes or aggregation levels.

That the G-RNTI is used for scrambling the first downlink control channel may mean that a CRC generated based on the DCI needs to be attached after DCI on the first downlink control channel, and the G-RNTI is used for scrambling the CRC. That the RNTI dedicated to the terminal device is used for scrambling the second downlink control channel means that a CRC generated based on the DCI needs to be attached after DCI on the second downlink control channel, and the RNTI dedicated to the terminal device is used for scrambling the CRC. Therefore, DCI with different functions uses different RNTIs.

Step S702: The terminal device detects the first downlink control channel in a common search space.

Step S703: The network device sends first time domain resource assignment information to the terminal device, where there is an association relationship between the first time domain resource assignment information and the G-RNTI.

It should be noted that a sequence of step S702 and step S703 is not limited in this application.

The first time domain resource assignment information is used to determine time domain resource allocation for a broadcast/multicast/multicast transmission PDSCH. The second time domain resource assignment information is used to determine time domain resource allocation for a unicast transmission PDSCH, and the terminal device may be configured with both the first time domain resource assignment information and the second time domain resource assignment information.

The association relationship between the first time domain resource assignment information and the G-RNTI means that the G-RNTI is used for scrambling the first downlink control channel, the first downlink control channel is used to schedule the first downlink data channel, and the first downlink control channel and the first time domain resource assignment information may be used to determine a time domain resource of the first downlink data channel.

Similarly, there is also an association relationship between the second time domain resource assignment information and the RNTI dedicated to the terminal device. The association relationship means that the RNTI dedicated to the terminal device is used for scrambling the second downlink control channel, the second downlink control channel is used to schedule a second downlink data channel, and the second downlink control channel and the second time domain resource assignment information may be used to determine a time domain resource of the second downlink data channel.

For example, the network device may allocate the first time domain resource assignment information and the second time domain resource assignment information to the terminal device in the following optional manners:

Optional manner 1: The network device configures dedicated (additional) first time domain resource assignment information for broadcast/multicast/multicast. That is, the first time domain resource assignment information is not time domain resource assignment information in unicast transmission, and is different from the PDSCH time domain resource assignment information predefined in the standards in Table 2 to Table 5, and independent of the PDSCH time domain resource assignment information indicated by the higher layer parameter pdsch-Config including pdsch-Time Domain Allocation List and the PDSCH time domain resource assignment information indicated by the system message pdsch-Config Common including pdsch-Time Domain Allocation List. The network device configures the second time domain resource assignment information for the terminal device by using higher layer signaling.

For the terminal device for which the RNTI dedicated to the terminal device is configured, if the second downlink control channel needs to be detected in the terminal device specific search space, the network device may configure, by using RRC signaling, the second time domain resource assignment information related to the RNTI dedicated to the terminal device. The second time domain resource assignment information may be a PDSCH time domain resource allocation table. The PDSCH time domain resource allocation table includes several rows, and information in each row includes: (1) a time offset value K0, where the time offset value is k if the terminal device receives the second downlink control channel in a time unit n and the second downlink data channel is received in a time unit n+k; (2) Start and Length Indicator Value (Start and Length Indicator Value, SLIV) of the second downlink data channel; and (3) a mapping type of the second downlink data channel. A time domain resource assignment field carried in the second downlink control channel scrambled by the RNTI dedicated to the terminal device is used to indicate that a row in the second time domain resource assignment information is used as a time domain resource for sending on the second downlink data channel scheduled by the second downlink control channel.

The terminal device further obtains the first time domain resource assignment information, where the G-RNTI is used for scrambling a CRC of the first downlink control channel, and a time domain resource occupied for transmission of the first downlink data channel is determined based on the first time domain resource assignment information. The network device may configure the first time domain resource assignment information for the terminal device in any one of the following manners: predefinition, system message configuration, or higher layer signaling configuration. The first time domain resource assignment information may be a time domain resource allocation table, which includes several rows, and each row includes at least one piece of the following information:

(1) Time offset value K0: If the terminal device receives the first downlink control channel in a time unit n (a first time unit), and receives the first downlink data channel in a time unit n+K0 (a second time unit), the time offset value is K0.

(2) SLIV value of the first downlink data channel in a time unit: The terminal device may obtain an index value S of a start OFDM symbol of the first downlink data channel in the time unit and a time domain length L of the first downlink data channel based on the SLIV value. The first downlink data channel occupies L consecutive OFDM symbols starting from an OFDM symbol of the index number S. The SLIV value is calculated as follows:

If $(L-1) \leq 7$, $SLIV = 14 \times (L-1) + S$

Otherwise, $SLIV = 14 \times (14-L+1) + (14-1-S)$, where $0 < L \leq 14-S$.

Alternatively, the description in (2) may be replaced with the following information: index value S of a start symbol of the first downlink data channel in a time unit and a time domain length value L.

(3) Mapping types of the first downlink data channel: There are Type A and Type B, and optionally may include another mapping type. This is not limited in this application. For different mapping types, the value ranges of parameters S, L, and S+L are different to support different types of time-domain scheduling. For example, for Type B, a time domain length L corresponding to the first downlink data channel may be 2, 4, or 7. As shown in Table 6, invoking the first downlink data channel is valid only when the corresponding parameters S, L, and S+L fall within corresponding value ranges.

TABLE 6

| PDSCH | Normal cyclic prefix (Normal cyclic prefix) | | | Extended cyclic prefix (Extended cyclic prefix) | | |
|---|---|---|---|---|---|---|
| Mapping type | S | L | S + L | S | L | S + L |
| Type A | {0, 1, 2, 3} (Note 1) | {3 . . . 14} | {3 . . . 14} | {0, 1, 2, 3} (Note 1) | {3 . . . 12} | {3 . . . 12} |
| Type B | {0 . . . 12} | {2, 4, 7} | {2 . . . 14} | {0 . . . 10} | {2, 4, 6} | {2 . . . 12} |

(Note 1) indicates that S = 3 is used only for dmrs-TypeA-Position = 3, and dmrs-TypeA-Position indicates the location of the first downlink demodulation reference signal (Demodulation Reference Signal, DMRS).

It should be noted that, in this application, the time unit may include N OFDM symbols, and N is an integer greater than or equal to 1. Optionally, the time unit is a slot, and one slot includes 14 OFDM symbols. Alternatively, the time unit is a mini-slot, and one mini-slot includes less than 14 OFDM symbols.

Optional manner 2: The network device configures the first time domain resource assignment information for broadcast/multicast/multicast transmission, where the first time domain resource assignment information is time domain resource assignment information common to a cell in unicast transmission. For example, the system message pdsch-Config Common includes PDSCH time domain resource assignment information indicated by pdsch-Time Domain Allocation List. The network device configures the second time domain resource assignment information for the terminal device by using higher layer signaling.

For the second time domain resource assignment information, refer to content in the optional manner 1. Details are not described again.

The terminal device may configure the first time domain resource assignment information for the terminal device in a system message configuration manner or higher layer signaling configuration manner, where the first time domain resource assignment information is a time domain resource allocation table common to the cell in unicast transmission. That is, all terminal devices in the cell may determine the time domain resource of the first downlink data channel based on the first time domain resource assignment information.

When the first time domain resource assignment information is a time domain resource allocation table, time domain resource assignment information included in each row of the first time domain resource assignment information is consistent with that described in the optional manner 1. Details are not described herein again.

Optional manner 3: The network device configures the first time domain resource assignment information for broadcast/multicast/multicast transmission in a predefined manner, where the first time domain resource assignment information is a time domain resource allocation table configured for unicast transmission in a predefined manner. The network device configures the second time domain resource assignment information for the terminal device by using higher layer signaling.

For example, the network device selects one from multiple predefined time domain resource allocation tables as the first time domain resource assignment information.

When the first time domain resource assignment information is a time domain resource allocation table, time domain resource assignment information included in each row of the first time domain resource assignment information is consistent with that described in the optional manner 1. Details are not described herein again.

Step S704: The terminal device determines the time domain resource of the first downlink data channel based on the first time domain resource assignment information and the first downlink control channel.

Step S704 may also be understood as: The terminal device determines the time domain resource of the first downlink data channel based on the first time domain resource assignment information, the first downlink control channel, and the association relationship between the first time domain resource assignment information and the G-RNTI.

The terminal device detects the first downlink control channel in the common search space. Assuming that a value of a time domain resource assignment field in the first downlink control channel is m, and the first time domain resource assignment information is a time domain resource allocation table, the terminal device may determine the time domain resource of the first downlink data channel from a row whose index number is m+1 in the time domain resource allocation table, that is, determine a location of the time domain resource of the first downlink data channel.

Figure 8:
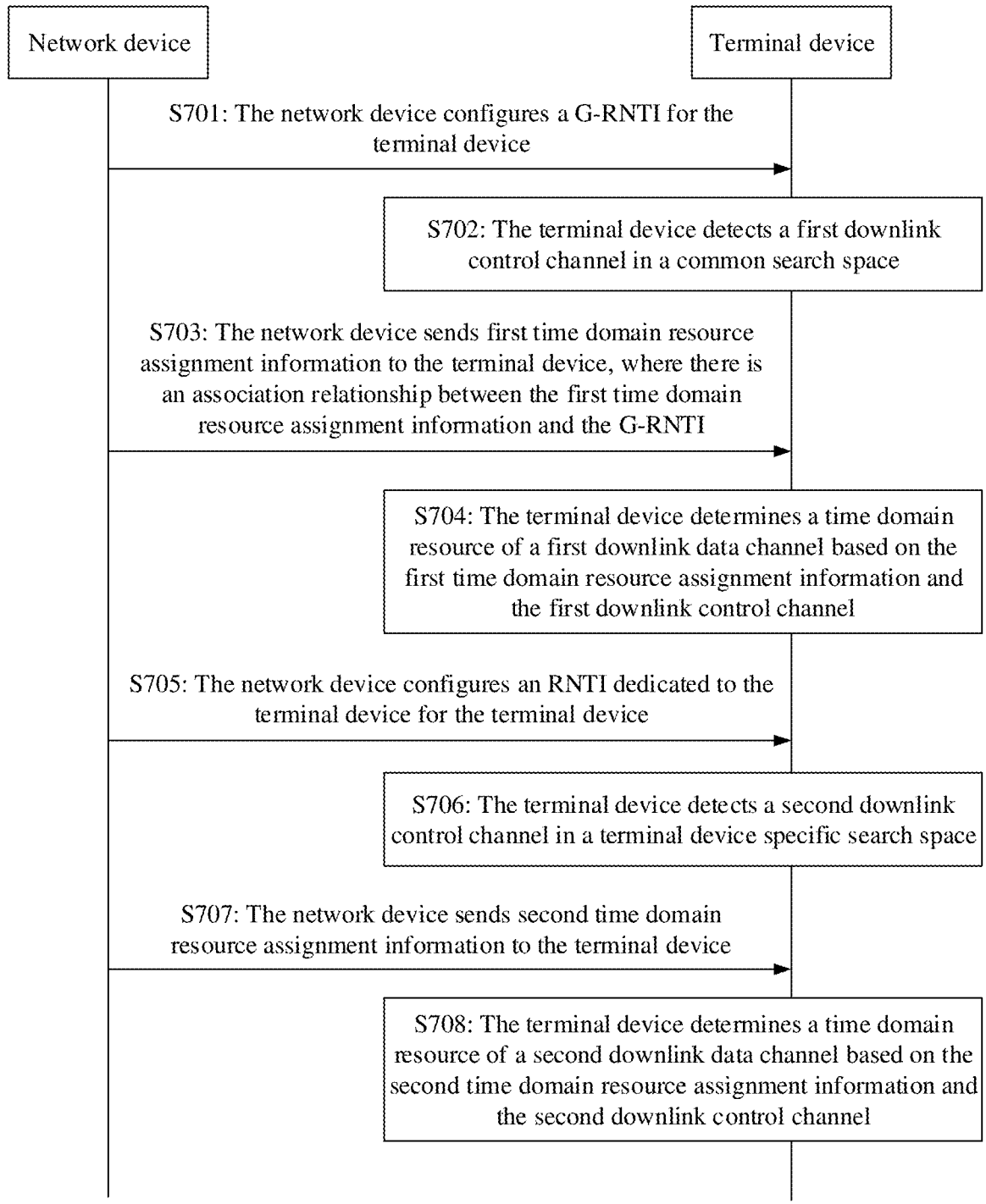
FIG. 8 is an interaction flowchart of a time domain resource determining method according to another embodiment of this application.

FIG. 8 is an interaction flowchart of a time domain resource determining method according to another embodiment of this application. The method involves network elements including a terminal device and a network device. As shown in FIG. 8, after step S704, the method further includes the following steps:

Step S705: The network device configures the RNTI dedicated to the terminal device for the terminal device.

Optionally, the network device configures the RNTI dedicated to the terminal device for the terminal device by using higher layer signaling.

Step S706: The terminal device detects the second downlink control channel in the terminal device specific search space.

Step S707: The network device sends the second time domain resource assignment information to the terminal device.

It should be noted that step S707 may be performed before step S705, or may be performed between step S705 and step S706, or may be performed simultaneously with step 5705. This is not limited in this application.

Step S708: The terminal device determines the time domain resource of the second downlink data channel based on the second time domain resource assignment information and the second downlink control channel Optionally, step S705 to step S708 may be applied to the following scenario: The terminal device receives broadcast data on the first downlink data channel When the terminal device determines that receiving the broadcast data fails, the network device may retransmit the broadcast data by using the second downlink data channel. Certainly, the technical solution provided in this embodiment is not only applicable to the application scenario.

The following uses the foregoing scenario as an example to describe this embodiment.

The terminal device determines that receiving the broadcast data fails, or the terminal device determines that feedback information needs to be sent to indicate that the terminal device fails to receive the broadcast data. The terminal device may send the feedback information to the network device, to indicate that the terminal device fails to receive the broadcast data. Alternatively, when the terminal device does not receive the broadcast data, the terminal device may not send the feedback information to the network device. When the network device does not receive the feedback information within a preset time period, it is considered that the terminal device does not receive the broadcast data.

For the network device, if only a few terminal devices fail to receive broadcast/multicast/multicast transmission sent to a group of terminal devices, the network device may retransmit the broadcast data in a unicast transmission manner. Because unicast transmission can provide terminal device-specific adaptive parameter configuration, link adaptive transmission is provided for a single terminal device. Retransmission in a unicast manner improves transmission reliability and a success rate. Therefore, in an example of retransmission in the unicast manner, the network device sends the second downlink control channel to the terminal device in the specific search space. A HARQ process number on the second downlink control channel is the same as or associated with a HARQ process number on the first downlink control channel. That the HARQ process number on the second downlink control channel is the same as or associated with the HARQ process number on the first downlink control channel enables the terminal device to determine that the second downlink data channel scheduled by the second downlink control channel is used to transmit the broadcast data. In addition, a new data indicator (new data indicator, NDI) on the second downlink control channel is not inverted.

After the terminal device detects the second downlink control channel in the specific search space, assuming that a value of a time domain resource assignment field in the second downlink control channel is m, and the second time domain resource assignment information is a time domain resource allocation table, in this case, the terminal device may determine the time domain resource of the second downlink data channel from a row whose index number is m+1 in the time domain resource allocation table, and receive the broadcast data on the second downlink data channel In conclusion, in this application, the network device configures the first time domain resource assignment information for the terminal device, and the first time domain resource assignment information meets a broadcast/multicast/multicast transmission requirement of the terminal device. Optionally, the network device may further configure the second time domain resource assignment information for the terminal device, so that both a unicast transmission requirement of the terminal device and the broadcast/multicast/multicast transmission requirement of the terminal device are met. The broadcast/multicast/multicast can save transmission resources and effectively avoid transmission congestion. Further, for the broadcast/multicast/multicast retransmission problem, if the network device determines that there are few terminal devices that retransmission is to be performed on, the network device may retransmit in the unicast manner.

Unicast retransmission is used, that is, the terminal device uses the time domain resource assignment information corresponding to the RNTI dedicated to the terminal device, to provide the terminal device-specific adaptive resource configuration, and provide link adaptive transmission for the single terminal device. This improves the reliability of broadcast/multicast retransmission, and improves the retransmission success rate.

Figure 9:
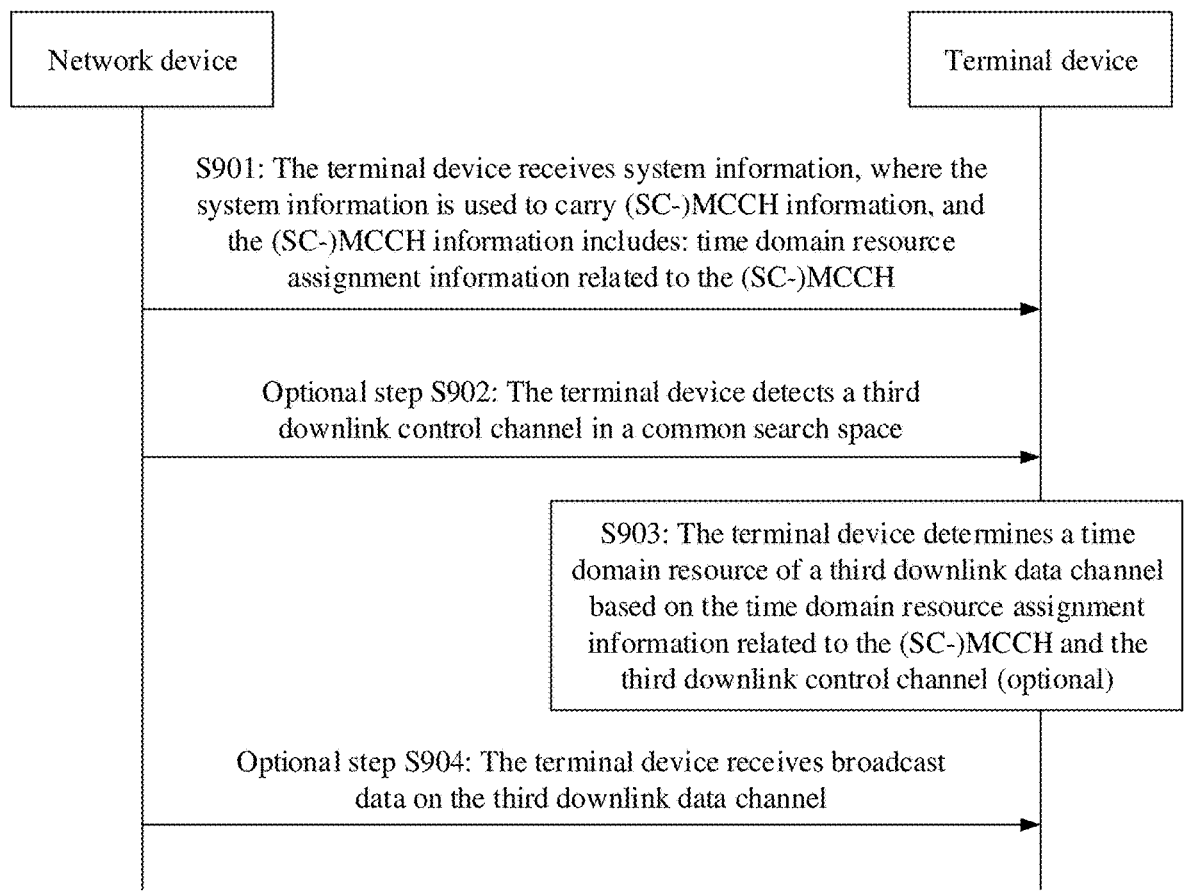
FIG. 9 is an interaction flowchart of a time domain resource determining method according to still another embodiment of this application.

FIG. 9 is an interaction flowchart of a time domain resource determining method according to still another embodiment of this application. The method involves network elements including a terminal device and a network device. As shown in FIG. 9, the method includes the following steps.

Step S901: A terminal device receives system information, where the system information is used to carry information about an (SC-)MCCH, and the information about the (SC-)MCCH includes time domain resource assignment information related to the (SC-)MCCH.

Optionally, the system information further includes an MP (modification period, modification period) and an RP (repetition period, repetition period) of the (SC-)MCCH, and a modification notification.

For the SC-PTM, the system information may be an SIB20. For the MBSFN, the foregoing system information may be an SIB13.

The following describes in detail the time domain resource assignment information related to the (SC-)MCCH in different scenarios.

For the SC-PTM, each cell is associated with a logical channel SC-MCCH. Information carried on the SC-MCCH is mapped to a third downlink data channel, where the third downlink data channel is scheduled by a third downlink control channel scrambled by an SC-RNTI. The network device may configure time domain resource assignment information related to the SC-MCCH for the terminal device, where the time domain resource assignment information related to the SC-MCCH is used to determine a time domain resource of the third downlink data channel.

For the MBSFN, each MBSFN service region is associated with a logical channel MCCH. Information carried on the MCCH is mapped onto a physical multicast channel (PMCH), where the physical multicast channel (that is, a third downlink data channel) is scheduled by a third downlink control channel scrambled by an RNTI. The network device may configure time domain resource assignment information related to the MCCH for the terminal device, where the time domain resource assignment information related to the MCCH is used to determine a time domain resource of the third downlink data channel For the time domain resource assignment information related to the (SC-)MCCH, refer to the first time domain resource assignment information and the second time domain resource assignment information in the foregoing embodiments. Details are not described herein again.

It should be noted that, in this embodiment, the terminal device may be in an idle mode (IDLE mode), an RRC connected mode (RRC connected mode), or an inactive mode (inactive mode). This is not limited in this embodiment.

Optional step S902: The terminal device detects the third downlink control channel in a common search space.

The third downlink control channel is used to schedule the third downlink data channel.

As described above, the third downlink data channel may be a PDSCH in the SC-PTM, or may be a PMCH in the MBSFN.

Step S903: The terminal device determines the time domain resource of the third downlink data channel based on the time domain resource assignment information related to the (SC-)MCCH and the third downlink control channel (optional).

Assuming that a value of a time domain resource assignment field in the third downlink control channel is m, and the time domain resource assignment information related to the (SC-)MCCH is a time domain resource allocation table, the terminal device may determine the time domain resource of the third downlink data channel from a row whose index number is m+1 in the time domain resource allocation table related to the (SC-)MCCH.

Optional step S904: The terminal device receives broadcast data on the third downlink data channel In conclusion, in this embodiment, the network device may configure the time domain resource assignment information related to the (SC-)MCCH for the terminal device by using the system information, so that time domain resource assignment information of unicast transmission is not used for broadcast/multicast/multicast transmission. This ensures effective broadcast/multicast/multicast transmission.

Figure 10:
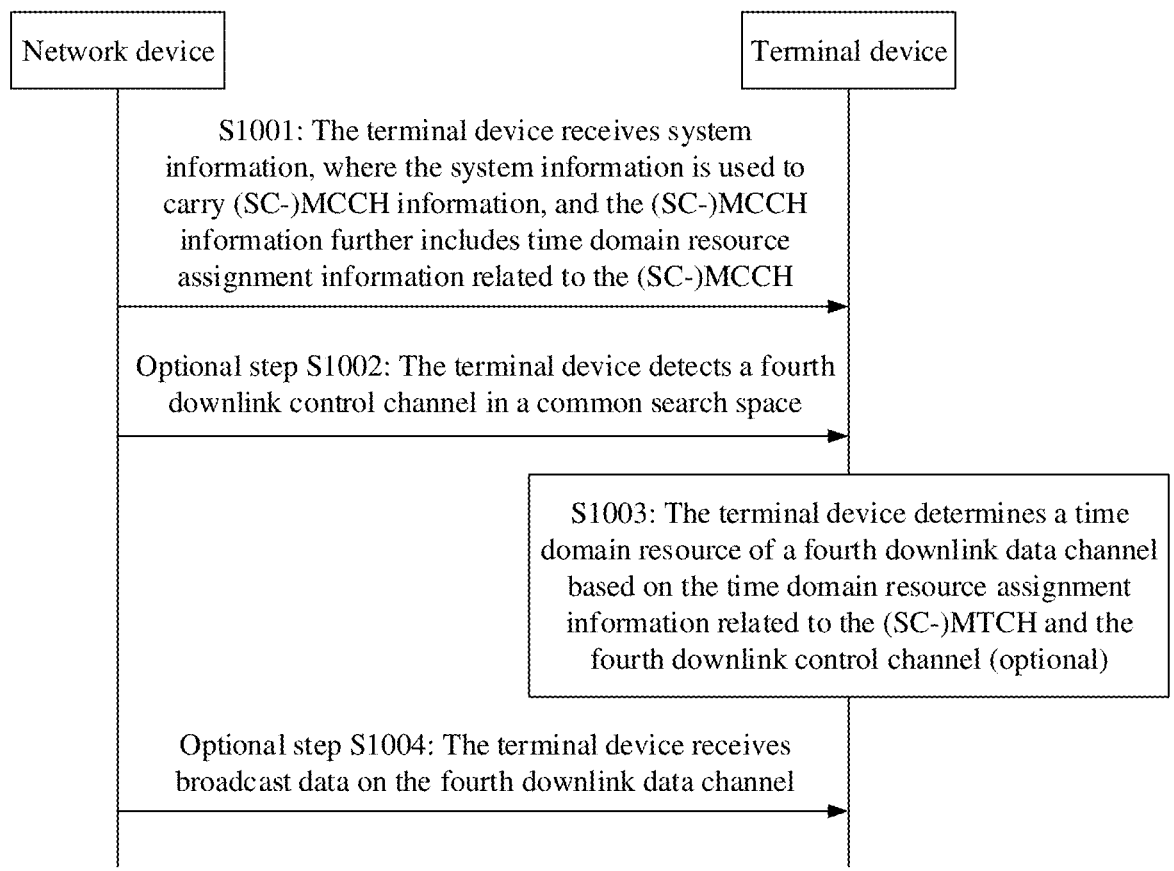
FIG. 10 is an interaction flowchart of a time domain resource determining method according to yet another embodiment of this application.

FIG. 10 is an interaction flowchart of a time domain resource determining method according to yet another embodiment of this application. The method involves network elements including a terminal device and a network device. As shown in FIG. 10, the method includes the following steps.

Step S1001: A terminal device receives system information, where the system information is used to carry information about an (SC-)MCCH, and the information about the (SC-)MCCH further includes time domain resource assignment information related to an (SC-)MTCH.

Optionally, the system information further includes an MP and an RP of the
(SC-)MCCH and a modification notification.

For the SC-PTM, the system information may be an SIB20. For the MBSFN, the foregoing system information may be an SIB13.

The following describes in detail the time domain resource assignment information related to the (SC-)MTCH in different scenarios.

For the SC-PTM, the logical channel SC-MTCH is used to transmit broadcast/multicast/multicast data. At a physical layer, information about the SC-MTCH is mapped to a fourth downlink data channel for transmission. The fourth downlink data channel is scheduled by using a fourth downlink control channel scrambled by a G-RNTI. The network device may indicate the time domain resource assignment information related to the SC-MTCH to the terminal device, and the time domain resource assignment information related to the SC-MTCH is carried in the system information. The time domain resource assignment information related to the SC-MTCH is used to determine a time domain resource of the fourth downlink data channel For the MBSFN, information about a logical channel MTCH may be mapped to the fourth downlink data channel (that is, a physical multicast channel PMCH) for transmission. The network device may indicate the time domain resource assignment information related to the MTCH to the terminal device, and the time domain resource assignment information related to the MTCH is carried in the system information. The time domain resource assignment information related to the MTCH is used to determine the time domain resource of the fourth downlink data channel For the time domain resource assignment information related to the (SC-)MTCH, refer to the first time domain resource assignment information and the second time domain resource assignment information in the foregoing embodiments. Details are not described again.

It should be noted that, in this embodiment, the terminal device may be in an idle (IDLE) mode or an RRC connected mode. This is not limited in this embodiment.

Optional step S1002: The terminal device detects the fourth downlink control channel in a common search space.

The fourth downlink control channel is used to schedule the fourth downlink data channel.

As described above, the fourth downlink data channel may be a PDSCH in the SC-PTM, or may be a PMCH in the MBSFN.

Step S1003: The terminal device determines a time domain resource of the fourth downlink data channel based on the time domain resource assignment information related to the (SC-)MTCH and the fourth downlink control channel (optional).

Assuming that a value of a time domain resource assignment field in the fourth downlink control channel is m, and the time domain resource assignment information related to the (SC-)MTCH is a time domain resource allocation table, the terminal device may obtain a row whose index number is m+1 in the time domain resource allocation table, to determine the time domain resource of the fourth downlink data channel Optional step S1004: The terminal device receives broadcast data on the fourth downlink data channel.

It should be noted that this embodiment and the foregoing embodiment may be executed together or may be executed separately.

In conclusion, in this embodiment, the network device may configure the time domain resource assignment information related to the (SC-)MTCH for the terminal device by using the system information, so that time domain resource assignment information of unicast transmission is not used for broadcast/multicast/multicast transmission. This ensures effective broadcast/multicast/multicast transmission.

Figure 11:
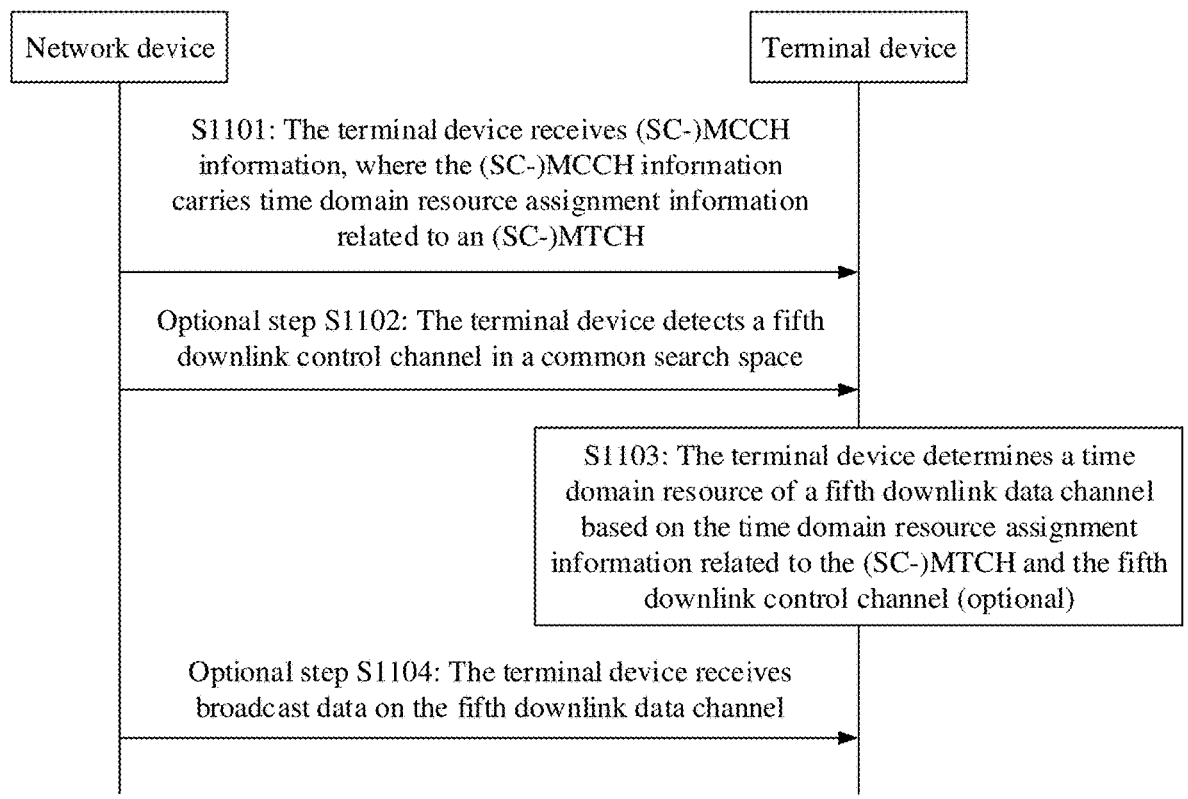
FIG. 11 is an interaction flowchart of a time domain resource determining method according to still yet another embodiment of this application.

FIG. 11 is an interaction flowchart of a time domain resource determining method according to still yet another embodiment of this application. The method involves network elements including a terminal device and a network device. As shown in FIG. 11, the method includes the following steps.

Step S1101: A terminal device receives (SC-)MCCH information, where the (SC-)MCCH information carries time domain resource assignment information related to an (SC-)MTCH.

The following describes in detail the time domain resource assignment information related to the (SC-)MTCH in different scenarios.

For the SC-PTM, the logical channel SC-MTCH is used to transmit broadcast/multicast/multicast data. At a physical layer, information about the SC-MTCH is sent on a fifth downlink data channel (PDSCH). The fifth downlink data channel is scheduled by using a fifth downlink control channel scrambled by an SC-RNTI. The network device may configure the time domain resource assignment information related to the SC-MTCH for the terminal device, where the time domain resource assignment information related to the SC-MTCH is used to determine a time domain resource of the fifth downlink data channel For the MBSFN, the logical channel MTCH may be mapped to a transport channel MCH, and information about the MCH is sent on the fifth downlink data channel (that is, a physical multicast channel PMCH). The network device may configure the time domain resource assignment information related to the MTCH for the terminal device, where the time domain resource assignment information related to the MTCH is used to determine a time domain resource of the fifth downlink data channel.

For the time domain resource assignment information related to the (SC-)MTCH, refer to the first time domain resource assignment information and the second time domain resource assignment information in the foregoing embodiments. Details are not described again.

It should be noted that, in this embodiment, the terminal device may be in an idle (IDLE) mode or an RRC connected mode. This is not limited in this embodiment.

Optional step S1102: The terminal device detects the fifth downlink control channel in a common search space.

The fifth downlink control channel is used to schedule the fifth downlink data channel As described above, the fifth downlink data channel may be a PDSCH in the SC-PTM, or may be a PMCH in the MBSFN.

Step S1103: The terminal device determines the time domain resource of the fifth downlink data channel based on the time domain resource assignment information related to the (SC-)MTCH and the fifth downlink control channel (optional).

Assuming that a value of a time domain resource assignment field in the fifth downlink control channel is m, and the time domain resource assignment information related to the (SC-)MTCH is a time domain resource allocation table, the terminal device may obtain a row whose index number is m+1 in the time domain resource allocation table, to determine the time domain resource of the fifth downlink data channel Optional step S1104: The terminal device receives broadcast data on the fifth downlink data channel In conclusion, in this embodiment, the network device may configure the time domain resource assignment information related to the (SC-)MTCH for the terminal device by using the SC-(MCCH) information, so that time domain resource assignment information of unicast transmission is not used for broadcast/multicast/multicast transmission. This ensures effective broadcast/multicast/multicast transmission.

Figure 12:
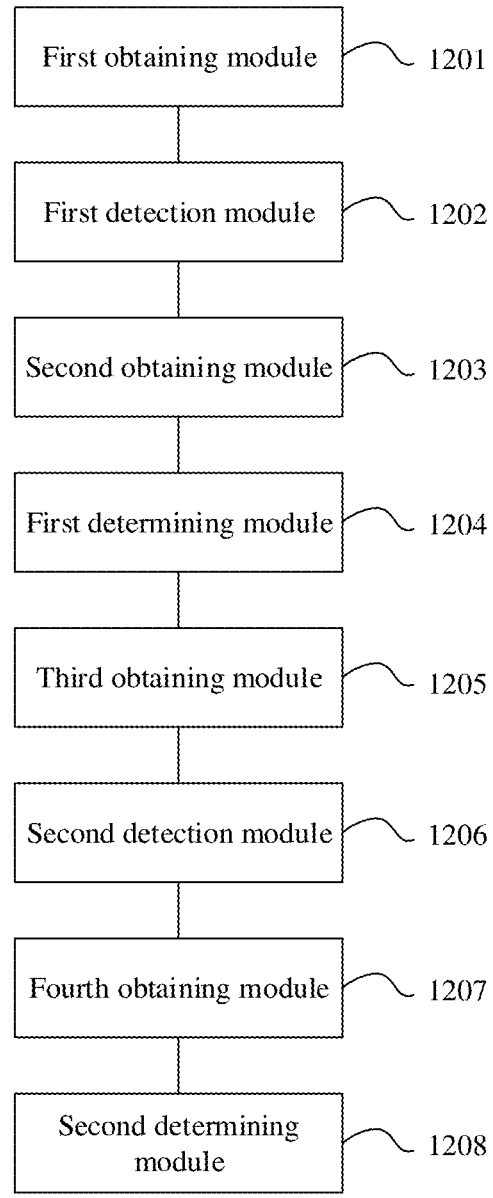
FIG. 12 is a schematic diagram of a time domain resource determining apparatus according to an embodiment of this application.

FIG. 12 is a schematic diagram of a time domain resource determining apparatus according to an embodiment of this application. The time domain resource determining apparatus is a part of or an entire terminal device. As shown in FIG. 12, the apparatus includes:

a first obtaining module 1201, configured to obtain a group-radio network temporary identifier G-RNTI;

a first detection module 1202, configured to detect a first downlink control channel in a common search space, where the G-RNTI is used for scrambling the first downlink control channel;

a second obtaining module 1203, configured to obtain first time domain resource assignment information, where there is an association relationship between the first time domain resource assignment information and the G-RNTI; and a first determining module 1204, configured to determine a time domain resource of a first downlink data channel based on the first time domain resource assignment information and the first downlink control channel Optionally, the apparatus further includes:

a third obtaining module 1205, configured to obtain a radio network temporary identifier RNTI dedicated to a terminal device;

a second detection module 1206, configured to detect a second downlink control channel in a terminal device specific search space, where the dedicated RNTI is used for scrambling the second downlink control channel;

a fourth obtaining module 1207, configured to obtain second time domain resource assignment information, where there is an association relationship between the second time domain resource assignment information and the dedicated RNTI; and a second determining module 1208, configured to determine a time domain resource of a second downlink data channel based on the second time domain resource assignment information and the second downlink control channel.

A hybrid automatic repeat request HARQ process number on the second downlink control channel is the same as a HARQ process number on the first downlink control channel Optionally, the first determining module 1204 is specifically configured to determine the time domain resource of the first downlink data channel based on a value of a time domain resource assignment field in the first downlink control channel and the first time domain resource assignment information.

Optionally, the first time domain resource assignment information is determined by the network device in any one of the following manners: predefinition, system message configuration, or higher layer signaling configuration.

Optionally, the first time domain resource assignment information includes at least one of the following: a time unit offset value, a start and length indicator value SLIV of the first downlink data channel, and a mapping type of the first downlink data channel The time unit offset value is an offset between a second time unit and a first time unit, the first time unit is a time unit for receiving the first downlink control channel, and the second time unit is a time unit for receiving the first downlink data channel The time domain resource determining apparatus provided in this embodiment of this application may be configured to perform the time domain resource determining method performed by the terminal device. For content and effects of the time domain resource determining apparatus, refer to the method embodiment part. Details are not described again.

Figure 13:
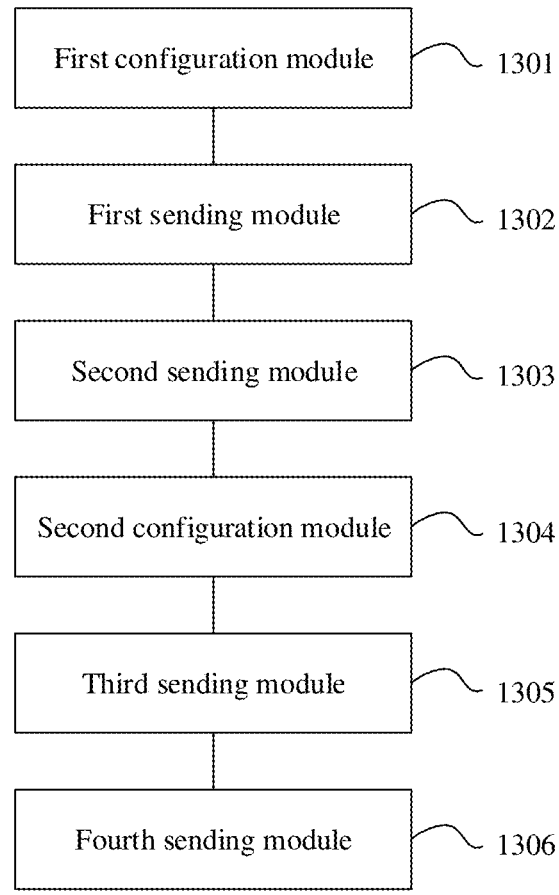
FIG. 13 is a schematic diagram of a time domain resource determining apparatus according to an embodiment of this application.

FIG. 13 is a schematic diagram of a time domain resource determining apparatus according to an embodiment of this application. The time domain resource determining apparatus is a part of or an entire network device. As shown in FIG. 13, the apparatus includes:

a first configuration module 1301, configured to configure a group-radio network temporary identifier G-RNTI;

a first sending module 1302, configured to send a first downlink control channel, where the G-RNTI is used for scrambling the first downlink control channel; and a second sending module 1303, configured to send first time domain resource assignment information to a terminal device, where there is an association relationship between the first time domain resource assignment information and the G-RNTI.

Optionally, the apparatus further includes:

a second configuration module 1304, configured to configure a radio network temporary identifier RNTI dedicated to the terminal device;

a third sending module 1305, configured to send a second downlink control channel to the terminal device, where the dedicated RNTI is used for scrambling the second downlink control channel; and a fourth sending module 1306, configured to send second time domain resource assignment information to the terminal device, where there is an association relationship between the second time domain resource assignment information and the dedicated RNTI.

A hybrid automatic repeat request HARQ process number on the second downlink control channel is the same as a HARQ process number on the first downlink control channel Optionally, the first time domain resource assignment information is determined by the network device in any one of the following manners: predefinition, system message configuration, or higher layer signaling configuration.

Optionally, the first time domain resource assignment information includes at least one of the following: a time unit offset value, a start and length indicator value SLIV of the first downlink data channel, and a mapping type of the first downlink data channel The time unit offset value is an offset between a second time unit and a first time unit, the first time unit is a time unit for receiving the first downlink control channel, and the second time unit is a time unit for receiving the first downlink data channel The time domain resource determining apparatus provided in this embodiment of this application may be configured to perform the time domain resource determining method performed by the network device. For content and effects of the time domain resource determining apparatus, refer to the method embodiment part. Details are not described again.

Figure 14:
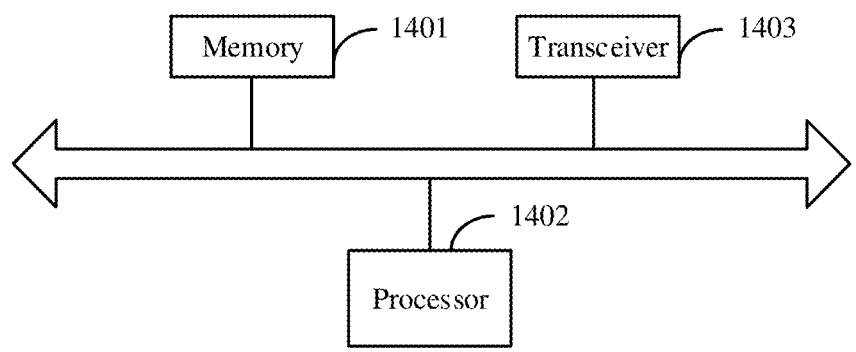
FIG. 14 is a schematic diagram of a terminal device according to an embodiment of this application.

FIG. 14 is a schematic diagram of a terminal device according to an embodiment of this application. As shown in FIG. 14, the terminal device includes a memory 1401 and a processor 1402. The memory is configured to store computer instructions, so that the processor executes the computer instructions, to implement the time domain resource determining method performed by the terminal device. For content and effects of the method, refer to the method embodiments.

Details are not described again. Optionally, the terminal device further includes a transceiver 1403, configured to implement data transmission with a network device or another device.

Figure 15:
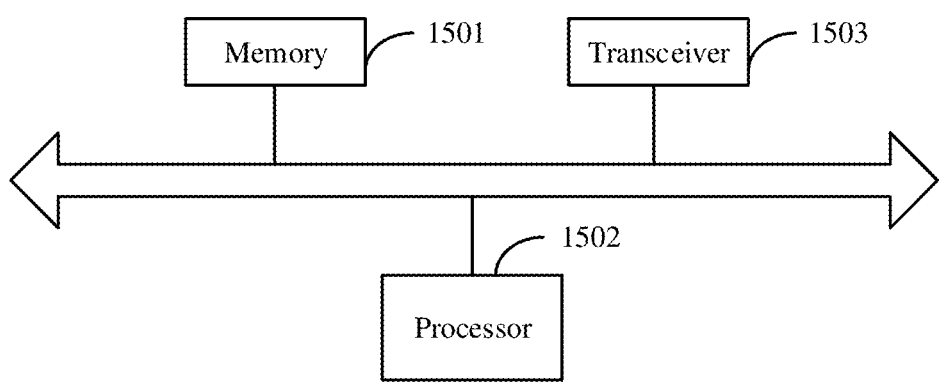
FIG. 15 is a schematic diagram of a network device according to an embodiment of this application.

FIG. 15 is a schematic diagram of a network device according to an embodiment of this application. As shown in FIG. 15, the network device includes a memory 1501 and a processor 1502. The memory is configured to store computer instructions, so that the processor executes the computer instructions, to implement the time domain resource determining method performed by the network device. For content and effects of the method, refer to the method embodiments. Details are not described again. Optionally, the network device further includes a transceiver 1503, configured to implement data transmission with a terminal device or another device.

This application provides a chip. The chip is configured to implement a time domain resource determining method performed by a terminal device. For content and an effect of the screen control method, refer to the method embodiment. Details are not described herein again.

This application provides a chip. The chip is configured to implement a time domain resource determining method performed by a network device. For content and an effect of the screen control method, refer to the method embodiment. Details are not described herein again.

This application provides a computer storage medium, including computer-executable instructions, where the computer-executable instructions are used to implement a time domain resource determining method performed by a terminal device. For content and an effect of the screen control method, refer to the method embodiment. Details are not described herein again.

This application provides a computer storage medium, including computer-executable instructions, where the computer-executable instructions are used to implement a time domain resource determining method performed by a network device. For content and an effect of the screen control method, refer to the method embodiment. Details are not described herein again.

What is claimed is:

1. A time domain resource determining method, comprising:
   obtaining a group-radio network temporary identifier (G-RNTI);
   detecting a first downlink control channel in a common search space, wherein the G-RNTI is used for scrambling the first downlink control channel;
   obtaining first time domain resource assignment information, wherein there is an association relationship between the first time domain resource assignment information and the G- RNTI, wherein the first time domain resource assignment information is predefined or a higher layer signaling;
   determining a time domain resource of a first downlink data channel based on the first time domain resource assignment information and the first downlink control channel;
   obtaining a dedicated radio network temporary identifier (RNTI), wherein the dedicated RNTI is dedicated to a terminal device;
   detecting a second downlink control channel in a terminal device specific search space, wherein the dedicated RNTI is used for scrambling the second downlink control channel;
   obtaining second time domain resource assignment information, wherein there is an association relationship between the second time domain resource assignment information and the dedicated RNTI; and
   determining a time domain resource of a second downlink data channel based on the second time domain resource assignment information and the second downlink control channel, wherein the second downlink control channel is for retransmission scheduling for data carried in the first downlink data channel.

2. The method according to claim 1,
   a hybrid automatic repeat request (HARQ) process number on the second downlink control channel is the same as a HARQ process number on the first downlink control channel.

3. The method according to claim 1, wherein the determining the time domain resource of the first downlink data channel based on the first time domain resource assignment information and the first downlink control channel comprises:
   determining the time domain resource of the first downlink data channel based on a value of a time domain resource assignment field in the first downlink control channel and the first time domain resource assignment information.

4. The method according to claim 1, wherein
   the first time domain resource assignment information comprises at least one of a time unit offset value, a start and length indicator value (SLIV) of the first downlink data channel, or a mapping type of the first downlink data channel, and
   the time unit offset value is an offset between a second time unit and a first time unit, the first time unit is for receiving the first downlink control channel, and the second time unit is for receiving the first downlink data channel.

5. A time domain resource determining method, comprising:
   configuring a group-radio network temporary identifier (G-RNTI);
   sending a first downlink control channel, wherein the G-RNTI is used for scrambling the first downlink control channel;
   sending first time domain resource assignment information to a terminal device, wherein there is an association relationship between the first time domain resource assignment information and the G-RNTI, wherein the first time domain resource assignment information is predefined or a higher layer signaling;
   configuring a dedicated radio network temporary identifier (RNTI), wherein the dedicated RNTI is dedicated to the terminal device;
   sending a second downlink control channel to the terminal device, wherein the dedicated RNTI is used for scrambling the second downlink control channel; and
   sending second time domain resource assignment information to the terminal device, wherein there is an association relationship between the second time domain resource assignment information and the dedicated RNTI, and the second downlink control channel is for retransmission scheduling for data carried in a first downlink data channel.

6. The method according to claim 5,
   wherein
   a hybrid automatic repeat request (HARQ) process number on the second downlink control channel is the same as a HARQ process number on the first downlink control channel.

7. The method according to claim 5, wherein
   the first time domain resource assignment information comprises at least one of a time unit offset value, a start and length indicator value (SLIV) of a first downlink data channel, or a mapping type of the first downlink data channel, and
   the time unit offset value is an offset between a second time unit and a first time unit, the first time unit is for receiving the first downlink control channel, and the second time unit is for receiving the first downlink data channel.

8. A communication apparatus, comprising:
a processor; and
a memory having instructions stored thereon that, when executed by the processor, cause the communication apparatus to:
obtain a group-radio network temporary identifier (G-RNTI);
detect a first downlink control channel in a common search space, wherein the G-RNTI is used for scrambling the first downlink control channel;
obtain first time domain resource assignment information, wherein there is an association relationship between the first time domain resource assignment information and the G-RNTI, wherein the first time domain resource assignment information is predefined or a higher layer signaling;
determine a time domain resource of a first downlink data channel based on the first time domain resource assignment information and the first downlink control channel;
obtain a dedicated radio network temporary identifier (RNTI), wherein the dedicated RNTI is dedicated to a terminal device;
detect a second downlink control channel in a terminal device specific search space, wherein the dedicated RNTI is used for scrambling the second downlink control channel;
obtain second time domain resource assignment information, wherein there is an association relationship between the second time domain resource assignment information and the dedicated RNTI; and
determine a time domain resource of a second downlink data channel based on the second time domain resource assignment information and the second downlink control channel, wherein the second downlink control channel is for retransmission scheduling for data carried in the first downlink data channel.

9. The communication apparatus according to claim 8, wherein
a hybrid automatic repeat request (HARQ) process number on the second downlink control channel is the same as a HARQ process number on the first downlink control channel.

10. The communication apparatus according to claim 8, wherein the communication apparatus is caused to determine the time domain resource of the first downlink data channel based on the first time domain resource assignment information by:
determining the time domain resource of the first downlink data channel based on a value of a time domain resource assignment field in the first downlink control channel and the first time domain resource assignment information.

11. The communication apparatus according to claim 8, wherein
the first time domain resource assignment information comprises at least one of a time unit offset value, a start and length indicator value (SLIV) of the first downlink data channel, and a mapping type of the first downlink data channel, and
the time unit offset value is an offset between a second time unit and a first time unit, the first time unit is for receiving the first downlink control channel, and the second time unit is for receiving the first downlink data channel.

12. A communication apparatus, comprising:
a processor; and
a memory having instructions stored thereon that, when executed by the processor, cause the communication apparatus to:
configure a group-radio network temporary identifier (G-RNTI);
send a first downlink control channel, wherein the G-RNTI is used for scrambling the first downlink control channel;
send first time domain resource assignment information to a terminal device, wherein there is an association relationship between the first time domain resource assignment information and the G-RNTI, wherein the first time domain resource assignment information is predefined or a higher layer signaling;
configure a dedicated radio network temporary identifier (RNTI), wherein the dedicated RNTI is dedicated to the terminal device;
send a second downlink control channel to the terminal device, wherein the dedicated RNTI is used for scrambling the second downlink control channel; and
send second time domain resource assignment information to the terminal device, wherein there is an association relationship between the second time domain resource assignment information and the dedicated RNTI, and the second downlink control channel is for retransmission scheduling for data carried in a first downlink data channel.

13. The communication apparatus according to claim 12, wherein
a hybrid automatic repeat request (HARQ) process number on the second downlink control channel is the same as a HARQ process number on the first downlink control channel.

14. The communication apparatus according to claim 12, wherein
the first time domain resource assignment information comprises at least one of a time unit offset value, a start and length indicator value (SLIV) of a first downlink data channel, and a mapping type of the first downlink data channel, and
the time unit offset value is an offset between a second time unit and a first time unit, the first time unit is for receiving the first downlink control channel, and the second time unit is for receiving the first downlink data channel.

15. A chip, wherein the chip is configured to implement the time domain resource determining method according to claim 1.

16. A chip, wherein the chip is configured to implement the time domain resource determining method according to claim 5.

17. A non-transitory computer storage medium, comprising computer-executable instructions, wherein the computer-executable instructions are used to implement the time domain resource determining method according to claim 1.

18. A non-transitory computer storage medium, comprising computer-executable instructions, wherein the computer-executable instructions are used to implement the time domain resource determining method according to claim 5.

* * * * *